United States Patent
McCord et al.

(10) Patent No.: US 11,922,923 B2
(45) Date of Patent: Mar. 5, 2024

(54) OPTIMAL HUMAN-MACHINE CONVERSATIONS USING EMOTION-ENHANCED NATURAL SPEECH USING HIERARCHICAL NEURAL NETWORKS AND REINFORCEMENT LEARNING

(71) Applicant: NEWVOICEMEDIA, LTD., Basingstoke (GB)

(72) Inventors: Alan McCord, Wakatipu Queenstown (NZ); Ashley Unitt, Basingstoke (GB); Brian Galvin, Seabeck, WA (US)

(73) Assignee: VONAGE BUSINESS LIMITED, Basingstoke (GB)

( * ) Notice: Subject to any disclaimer, the term of this patent is extended or adjusted under 35 U.S.C. 154(b) by 918 days.

(21) Appl. No.: 16/863,855

(22) Filed: Apr. 30, 2020

(65) Prior Publication Data
US 2020/0320974 A1    Oct. 8, 2020

Related U.S. Application Data

(63) Continuation of application No. 15/661,341, filed on Jul. 27, 2017, now abandoned, which is a
(Continued)

(51) Int. Cl.
| | | |
|---|---|---|
| *G10L 13/10* | (2013.01) | |
| *G06N 3/04* | (2023.01) | |
| *G06N 3/045* | (2023.01) | |
| *G06N 3/08* | (2023.01) | |
| *G10L 13/033* | (2013.01) | |
| *G10L 13/047* | (2013.01) | |
| *G10L 25/63* | (2013.01) | |

(52) U.S. Cl.
CPC ............... *G10L 13/10* (2013.01); *G06N 3/04* (2013.01); *G06N 3/045* (2023.01); *G06N 3/08* (2023.01); *G10L 13/033* (2013.01); *G10L 13/047* (2013.01); *G10L 25/63* (2013.01)

(58) Field of Classification Search
None
See application file for complete search history.

(56) References Cited

U.S. PATENT DOCUMENTS

| | | |
|---|---|---|
| 7,222,077 B2 | 5/2007 | Kwan |
| 8,527,276 B1 | 9/2013 | Senior et al. |

(Continued)

OTHER PUBLICATIONS

Eyben, F. et al., "Unsupervised clustering of emotion and voice styles for expressive TTS," 2012 IEEE Intl. Conf. on Acoustics, Speech, and Signal Processing (2012) pp. 4009-4012 (Year: 2012).*

*Primary Examiner* — Brian M Smith
(74) *Attorney, Agent, or Firm* — Boon Intellectual; Brian S. Boon; Joseph Pagnotta

(57) ABSTRACT

A system and method for emotion-enhanced natural speech using dilated convolutional neural networks, wherein an audio processing server receives a raw audio waveform from a dilated convolutional artificial neural network, associates text-based emotion content markers with portions of the raw audio waveform to produce an emotion-enhanced audio waveform, and provides the emotion-enhanced audio waveform to the dilated convolutional artificial neural network for use as a new input data set.

2 Claims, 20 Drawing Sheets

Related U.S. Application Data continuation-in-part of application No. 15/442,667, filed on Feb. 25, 2017, now abandoned, which is a continuation-in-part of application No. 15/268,611, filed on Sep. 18, 2016, now abandoned.

(60) Provisional application No. 62/516,672, filed on Jun. 8, 2017, provisional application No. 62/441,538, filed on Jan. 2, 2017.

(56) References Cited

U.S. PATENT DOCUMENTS

| | | |
|---|---|---|
| 8,571,871 B1 | 10/2013 | Stuttle et al. |
| 9,031,293 B2 | 5/2015 | Kalinli-Akbacak |
| 9,570,063 B2 | 2/2017 | Bao et al. |
| 9,634,855 B2 | 4/2017 | Poltorak |
| 9,824,681 B2 | 11/2017 | Luan et al. |
| 2009/0312985 A1 | 12/2009 | Eliazar |
| 2011/0112825 A1* | 5/2011 | Bellegarda .............. G06F 40/30 704/E13.011 |
| 2011/0307258 A1 | 12/2011 | Liberman et al. |
| 2013/0191185 A1 | 7/2013 | Galvin |
| 2015/0032449 A1 | 1/2015 | Sainath et al. |
| 2015/0058019 A1* | 2/2015 | Chen ....................... G10L 13/08 704/260 |
| 2016/0071510 A1 | 3/2016 | Li et al. |
| 2021/0225357 A1* | 7/2021 | Zhao .................... G10L 13/027 |

* cited by examiner

OPTIMAL HUMAN-MACHINE CONVERSATIONS USING EMOTION-ENHANCED NATURAL SPEECH USING HIERARCHICAL NEURAL NETWORKS AND REINFORCEMENT LEARNING

CROSS-REFERENCE TO RELATED APPLICATIONS

| Application No. | Date Filed | Title |
|---|---|---|
| Current application | Herewith | OPTIMAL HUMAN-MACHINE CONVERSATIONS USING EMOTION-ENHANCED NATURAL SPEECH USING HIERARCHICAL NEURAL NETWORKS AND REINFORCEMENT LEARNING Is a continuation of: |
| 15/661,341 | Jul. 27, 2017 | OPTIMAL HUMAN-MACHINE CONVERSATIONS USING EMOTION-ENHANCED NATURAL SPEECH USING HIERARCHICAL NEURAL NETWORKS AND REINFORCEMENT LEARNING which claims benefit of and priority to: |
| 62/516,672 | Jun. 8, 2017 | OPTIMAL HUMAN-MACHINE CONVERSATIONS USING EMOTION-ENHANCED NATURAL SPEECH USING HIERARCHICAL NEURAL NETWORKS AND REINFORCEMENT LEARNING and is a continuation-in-part of: |
| 15/442,667 | Feb. 25, 2017 | SYSTEM AND METHOD FOR OPTIMIZING COMMUNICATION OPERATIONS USING REINFORCEMENT LEARNING which claims benefit of and priority to: |
| 62/441,538 | Jan. 2, 2017 | SYSTEM AND METHOD FOR OPTIMIZING COMMUNICATION OPERATIONS USING REINFORCEMENT LEARNING and is a continuation-in-part of: |
| 15/268,611 | Sep. 18, 2016 | SYSTEM AND METHOD FOR OPTIMIZING COMMUNICATIONS USING REINFORCEMENT LEARNING | the entire specification of each of which is incorporated herein by reference.

BACKGROUND

Field of the Art

The disclosure relates to the field of human-computer interaction, and more particularly to the field of recognizing and reproducing emotions using hierarchical neural networks.

Discussion of the State of the Art

Recognizing human emotion in transcribed or recorded speech is a difficult task for computer programs, and producing convincing emotion in text-to-speech is often a labor-intensive process involving manual configuration and emotion-tagging. Systems that can automatically understand the sequence of emotions in speech, choose optimal responses with appropriately chosen sentiment are not currently known to the inventor.

What is needed, is a means to automatically recognize and reproduce humanlike emotion in text and speech, that can adapt to complex emotional states and represent emotion as a time series of values that change over time. Furthermore the use of emotion in the reproduced text should be done in a way that maximizes some objective defined for the conversation by one or both parties.

SUMMARY

Accordingly, the inventor has conceived and reduced to practice, a system and method for emotion-enhanced natural speech using hierarchical neural networks together with an optimization component for optimally choosing content and emotion level in the conversations.

The aspects disclosed herein provide a means for producing emotion-enhanced natural speech audio generation using hierarchical neural networks, wherein an audio processing server receives a raw audio waveform from a hierarchical neural network, associates text-based emotion content markers with portions of the raw audio waveform to produce an emotion-enhanced audio waveform, and provides the emotion-enhanced audio waveform to the dilated convolutional neural network for use as a new input data set.

According to one aspect, a system for emotion-enhanced natural speech audio generation using dilated convolutional neural networks, comprising: an audio processing server comprising at least a plurality of programming instructions stored in a memory and operating on a processor of a network-connected computing device and configured to provide a plurality of input data to, and receive a plurality of output data from, a dilated convolutional artificial neural network; wherein the audio processing server is configured to receive at least a raw audio waveform from the dilated convolutional artificial neural network; wherein the audio processing server is configured to produce an emotion-enhanced audio waveform by associating a plurality of text-based emotion content markers with at least a portion of the audio waveform; and wherein the audio processing server is configured to provide the emotion-enhanced audio waveform to the dilated convolutional artificial neural network as an input data set, is disclosed.

According to another aspect, a method for emotion-enhanced natural speech audio generation using dilated convolutional neural networks, comprising the steps of: receiving, at an audio processing server comprising at least a plurality of programming instructions stored in a memory and operating on a processor of a network-connected computing device and configured to provide a plurality of input data to, and receive a plurality of output data from, a dilated convolutional artificial neural network, at least a raw audio waveform from the dilated convolutional artificial neural network; associating a plurality of text-based emotion content markers with at least a portion of the audio waveform, producing an emotion-enhanced audio waveform; and providing the emotion-enhanced audio waveform to the dilated convolutional artificial neural network as an input data set, is disclosed.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION

Figure 1:
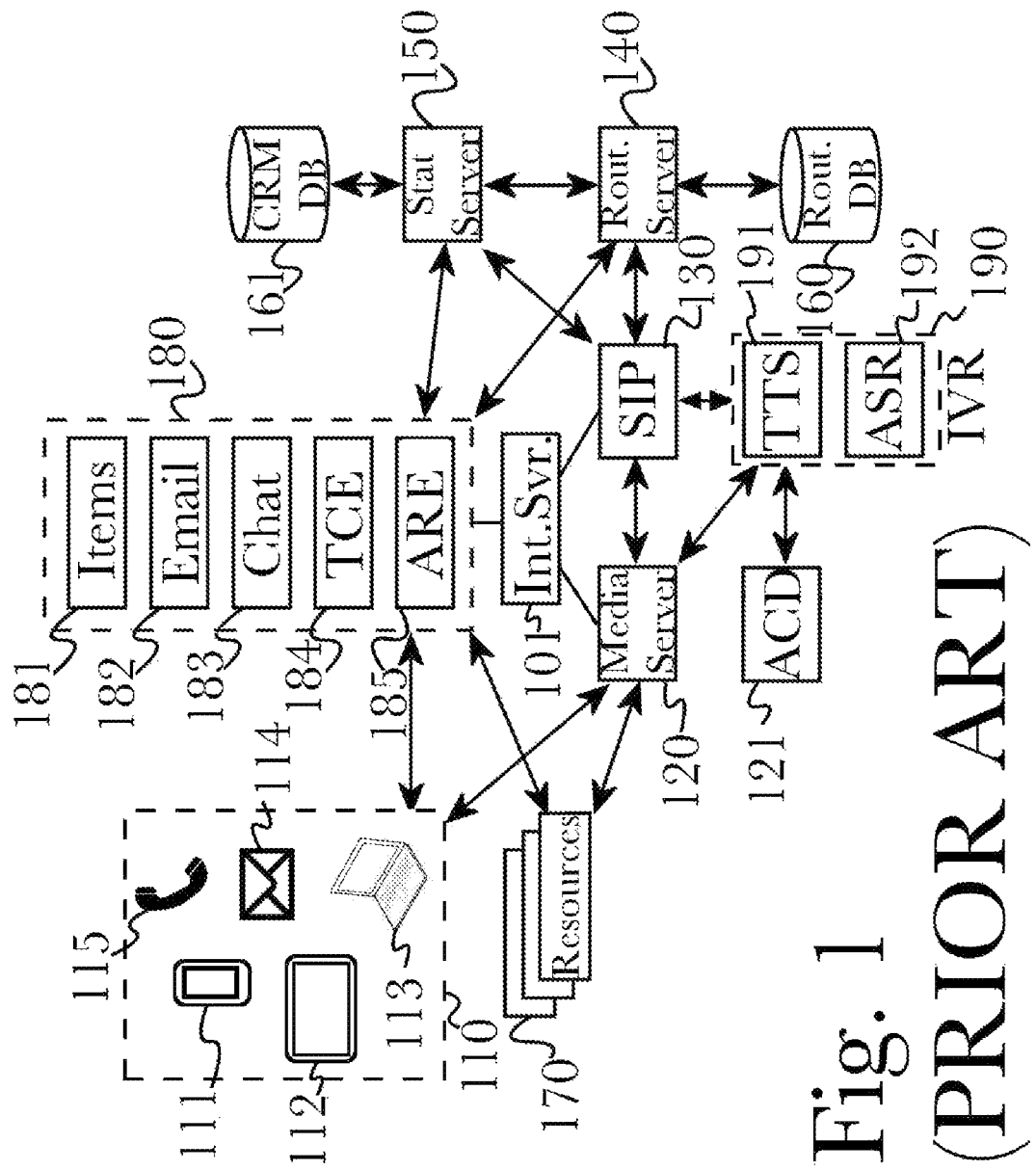
FIG. 1 (PRIOR ART) is a block diagram illustrating an exemplary system architecture for a contact center.

The inventor has conceived, and reduced to practice, a system and method for emotion-enhanced natural speech using dilated convolutional neural networks.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of aspects in which, for example, functions may be executed out of order from that shown or discussed, including substantially concurrently or in reverse order, depending on the functionality involved, as would be understood by those having ordinary skill in the art.

Conceptual Architecture

FIG. 1 (PRIOR ART) is a block diagram of an exemplary system architecture for a contact center. According to the embodiment, a plurality of interaction types 110 may be received from a variety of services or devices, such as (for example, including but not limited to) a smartphone 111, tablet computing device 112, personal computer 113, email service 114, or telephone network 115. Interactions 110 may be delivered to, or initiated outward from, media server 120 or an appropriate text-based interaction handler 180, according to the specific nature of the interaction, by an interaction server 101 that operates as a central interaction handler for routing interactions appropriately based on their type or context. Text-based handlers 180 may comprise handlers for work items 181 such as internal actionable items that may not necessarily involve customer interaction directly (for example, processing a credit application, which is certainly a part of a customer interaction but is handled fully "behind the scenes"), email server 182 for handling email messages, chat server 183 for handling IP-based chat interactions, text classification engine (TCE) 184 for classifying and routing text-based interactions appropriately, and auto response engine (ARE) 185 for automatically responding to text interactions when possible (for example, for producing automated responses to simple account-related queries).

In some arrangements where a single medium (such as telephone calls) is used for interactions which require routing, media server 120 may be more specifically a private branch exchange (PBX), or an automated call distributor (ACD) 121 may be utilized, or similar media-specific switching system. Interactions may be received via an interactive voice response (IVR) 190 that may comprise text-to-speech 191 and automated speech recognition 192 elements to provide voice prompts and handle spoken input from callers. Generally, when interactions arrive at media server 120, a route request, or a variation of a route request (for example, a SIP invite message), is sent to session initiation protocol SIP server 130, or to an equivalent system such as a computer telephony integration (CTI) server. A route request may comprise a data message sent from a media-handling device such as media server 120 to a signaling system such as SIP server 130, the message comprising a request for one or more target destinations to which to send (or route, or deliver) the specific interaction with regard to which the route request was sent. SIP server 130 or its equivalent may, in some embodiments, carry out any required routing logic itself, or it may forward the route request message to routing server 140. In a preferred embodiment, routing server 140 uses historical or real time information, or both, from statistics server 150, as well as configuration information (generally available from a distributed configuration system, not shown for convenience) and information from routing database 160. Routing database 160 may comprise multiple distinct databases, either stored in one database management system or in separate database management systems, and additional databases may be utilized for specific purposes such as (for example, including but not limited to) a customer relationship management (CRM) database 161. Examples of data that may normally be found in a database 160, 161 may include (but are not limited to): customer relationship management (CRM) data; data pertaining to one or more social networks (including, but not limited to network graphs capturing social relationships within relevant social networks, or media updates made by members of relevant social networks); skills data pertaining to a plurality of resources 170 (which may be human agents, automated software agents, interactive voice response scripts, and so forth); data extracted from third party data sources including cloud-based data sources such as CRM and other data from Salesforce.com, credit data from Experian, consumer data from data.com; or any other data that may be useful in making routing decisions. It will be appreciated by one having ordinary skill in the art that there are many means of data integration known in the art, any of which may be used to obtain data from premise-based, single machine-based, cloud-based, public or private data sources as needed, without departing from the scope of the invention. Using information obtained from one or more of statistics server 150, routing database 160, CRM database 161, and any associated configuration systems, routing server 140 selects a routing target from among a plurality of available resources 170, and routing server 140 then instructs SIP server 130 to route the interaction in question to the selected resource 170, and SIP server 130 in turn directs media server 120 to establish an appropriate connection between interaction 110 and target resource 170. It should be noted that interactions 110 are generally, but not necessarily, associated with human customers or users. Nevertheless, it should be understood that routing of other work or interaction types is possible, according to the present invention. For example, in some embodiments work items, such as loan applications that require processing, are extracted from a work item backlog or other source and routed by a routing server 140 to an appropriate human or automated resource to be handled.

Figure 4:
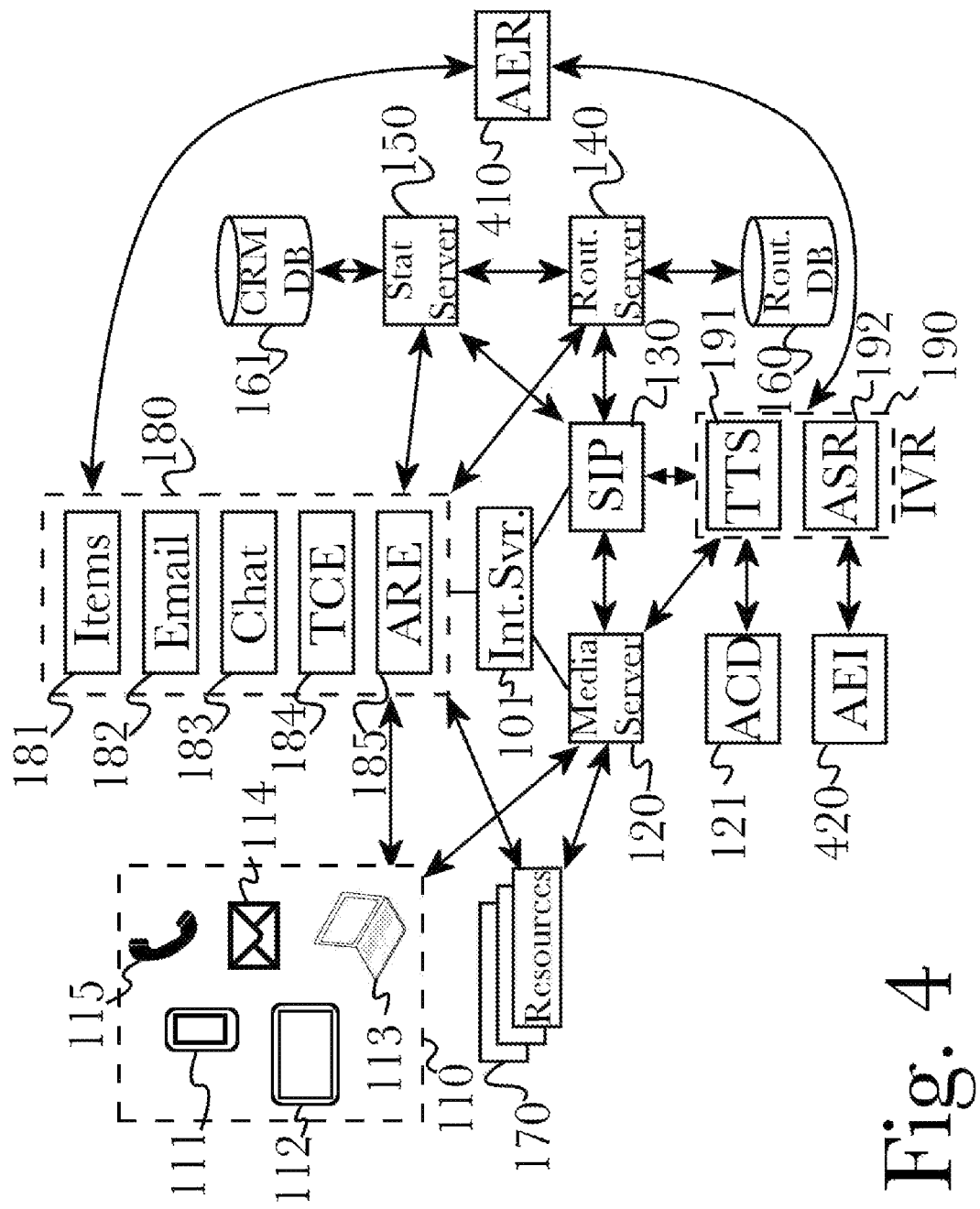
FIG. 4 is a block diagram of an exemplary system architecture for a contact center utilizing automated emotion recognition and injection, according to one aspect.

FIG. 4 is a block diagram of an exemplary system architecture for a contact center utilizing automated emotion recognition and injection, according to one aspect. According to the aspect, an automated emotion engine configured to operate in a generative output mode as an automated emotion injection (AEI) engine 420 may be used to produce an audio waveform from an input data set from a text-to-speech (TTS) engine 191 using dilated causal convolution, (this technique is described in greater detail above, referring to FIG. 2). According to another aspect, an automated emotion engine configured to operate in a discriminative output mode as an automated emotion recognition (AER) engine 410 may be used to detect and recognize emotion content in existing audio, receiving emotion-laden audio as input to recognize emotion characteristics in the audio. This may then be used to determine appropriate emotions based on passages of text (such as a text-to-speech transcript), or to enhance selection of emotion for use in audio output, as well as to refine the specific characteristics of any particular emotional state to more realistically emulate that emotion during audio generation.

TTS engine 191 may produce audio from text-based scripts or generated sections of text as they are produced as output by an AEI 420, and generated speech may comprise a wide variety of linguistic and phonetic features such as syllables or phonemes and contextual information such as word usage or variations (for example, verb conjugations or noun declensions). Additionally, emotional detail may be transcribed into text and used to encode natural emotional content of human speech, such as inflection and cadence changes based on a speaker's attitude, or to encode variations based on interactions between a speaker and audience (for example, a speaker may speak with different emotion depending on the age or other factors in their audience). This emotional content may be provided along with a raw audio waveform to an AEI 420 that may associate emotional attributes with data points within the generated raw audio waveform (as described below, referring to FIG. 6), matching emotion to data points in the audio waveform to mark emotion-driven speech characteristics (such as changes in intonation or word choice, for example). Additionally, the text-based emotional content identifiers may be provided to a DCANN learning model as input variables to enhance audio generation, as described below (referring to FIGS. 5-6) by conditioning the learning model with the emotional content as a new input variable. This emotion-enhanced speech audio may then be used in future raw audio generation by the AEI 420 as additional input data in future convolutional generation, enhancing all future raw audio waveforms in an autoregressive neural learning model. This technique associates raw audio data with text markers identifying emotional content, producing a mixed-output speech synthesis that combines the natural audio properties possible using raw audio generation and the enhanced quality of incorporating emotional variables into the generation of audio waveforms, producing even more natural-sounding synthesized speech audio.

DETAILED DESCRIPTION OF EXEMPLARY ASPECTS

Figure 2:
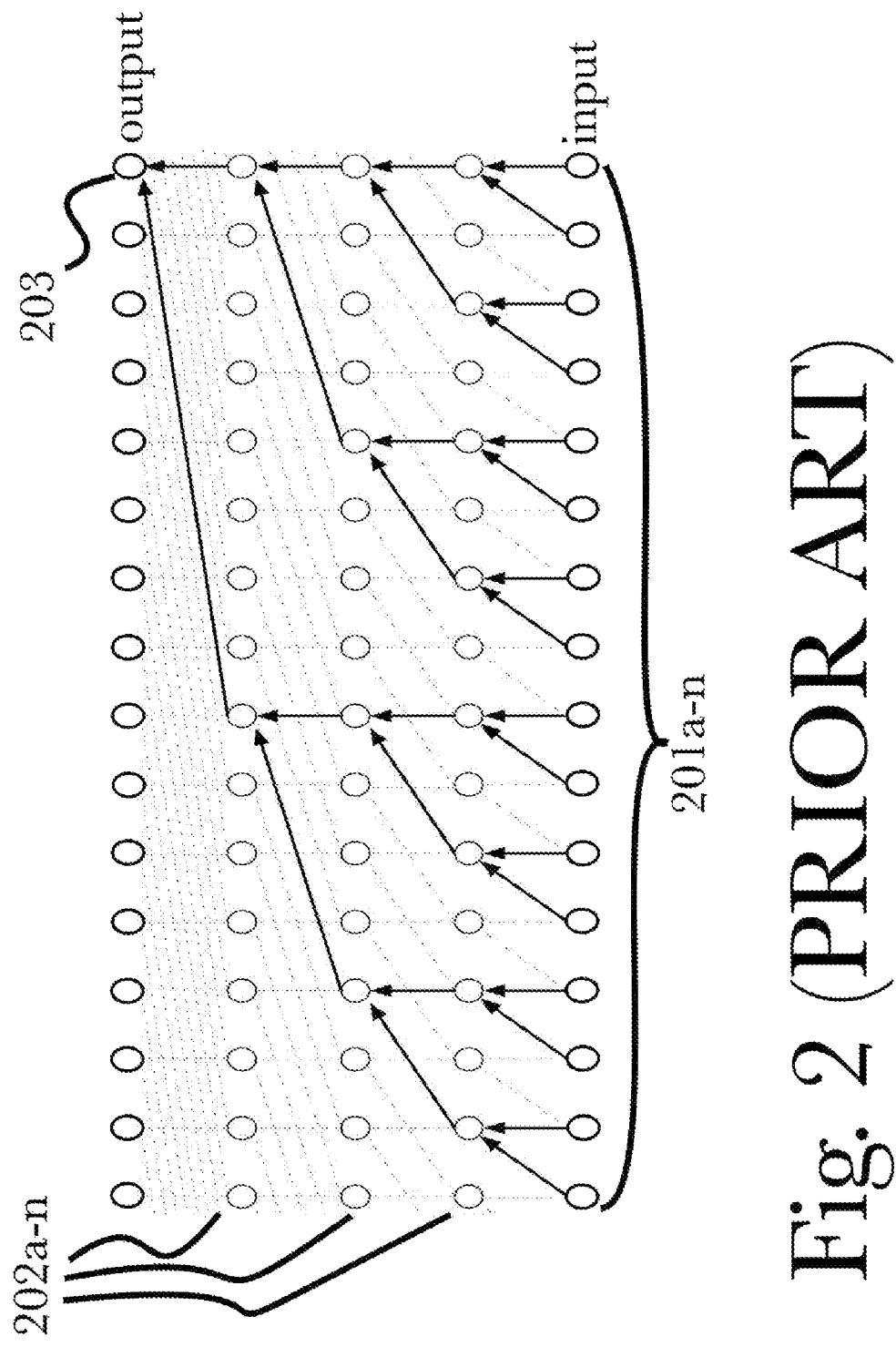
FIG. 2 (PRIOR ART) is a diagram illustrating dilated convolutional neural network operation, illustrating the autoregressive nature of raw audio generation.

FIG. 2 (PRIOR ART) is a diagram illustrating dilated convolutional neural network operation, illustrating the autoregressive nature of raw audio generation. In a dilated convolutional artificial neural network (DCANN), input data is processed using stacked dilated convolutions, in which a dilation factor is applied to a set of input data to allow for some input values to be skipped based on the dilation factor, which enables improved efficiency of processing without losing data. A dilated convolution effectively allows the network to operate on a coarser scale than with a normal convolution. This is similar to pooling or strided convolutions, but here the output has the same size as the input. As a special case, dilated convolution with a dilation factor of 1 yields the standard convolution. As illustrated, each input data sample 201*a*-*n* is processed through a number of convolutional layers 202*a*-*n* to arrive at a final output data sample 203, which is then used as an additional input sample in future operations.

Figure 3:
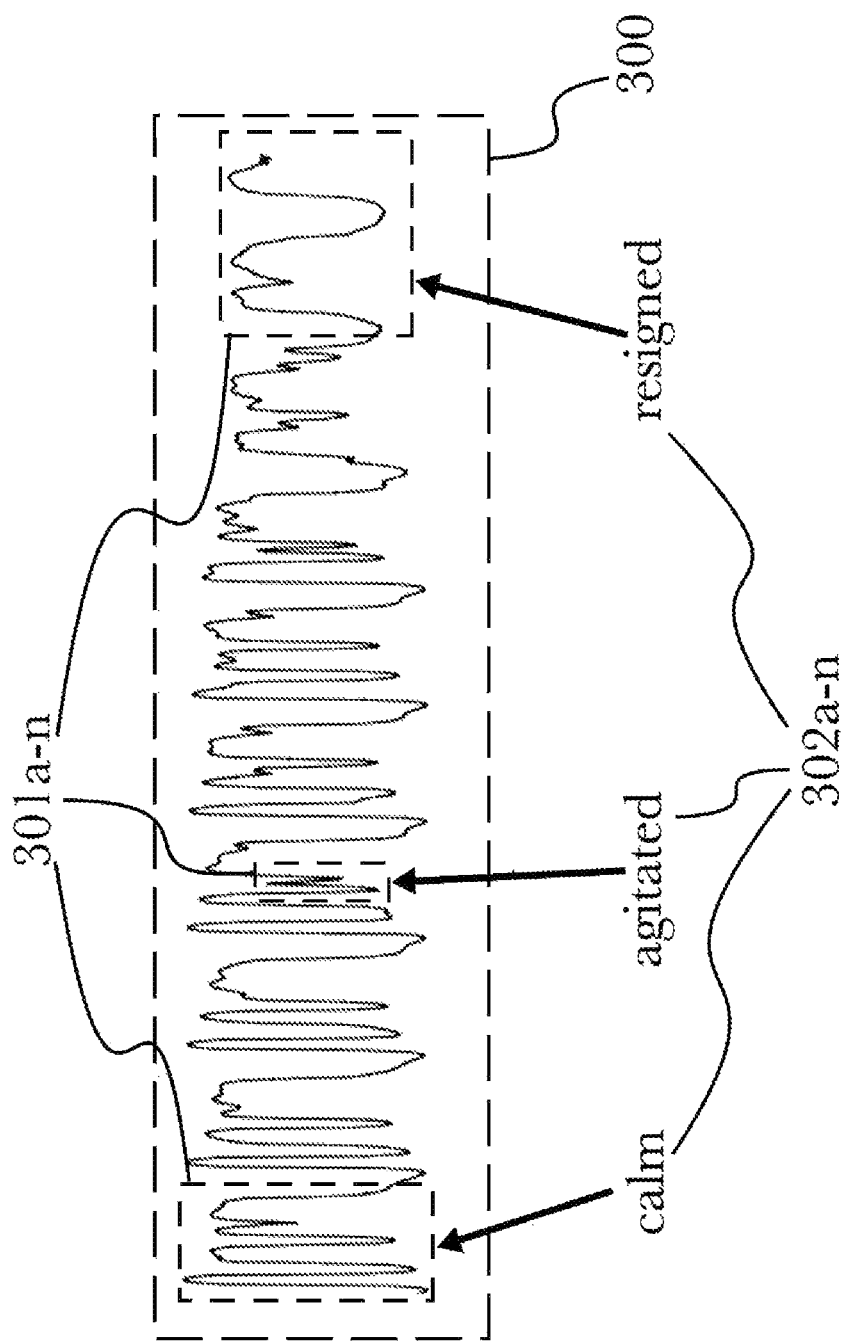
FIG. 3 is a diagram illustrating an exemplary speech audio waveform, showing the association of textual content with audio samples within a produced audio waveform output, according to one aspect.

FIG. 3 is a diagram illustrating an exemplary speech audio waveform 300, showing the association of textual content 302*a*-*n* with audio samples 301*a*-*n* within a produced audio waveform output 300, according to one aspect. According to the aspect, a plurality of text-based markers or identifiers 302*a*-*n* may be stored with a TTS transcript for a given selection of audio, and may encode a variety of linguistic and phonetic properties as well as a variety of emotional attributes. Emotional attributes may be any descriptors or identifiers that may be consistently used to mark an emotional state, or a change in emotional state, or any form of emotional content on the part of the speaker of a given selection of audio. For example, a teacher speaking to a student may be any of a wide variety of emotional attributes influencing their speech, including (but not limited to) their overall mood at that time influencing a conversation as a whole, to fine-grained emotional details such as momentary variances (whether conscious or subconscious) in their speech due to such factors as physical stimuli (such as a momentary itch or sensation of hunger, for example) or breathing that may influence small portions of speech such as individual words or phonemes. These emotional attributes 302*a*-*n* may be associated by an automated emotion recognition (AER) engine 410 with portions of audio 301*a*-*n* in a section of an audio waveform 300 according to the text transcript used to produce the raw audio 300, connecting the emotional markers with the time at which they occur during speech. This information may then be provided as input data to a DCANN learning model, conditioning the learning process to incorporate emotional content through learning the variances and qualities in audio that occur when various emotional markers are present. This may then be used in future audio waveform generation to produce output with implicit emotional content as needed, creating more natural and convincing audio synthesis than is currently possible using traditional techniques and learning models.

Figure 5:
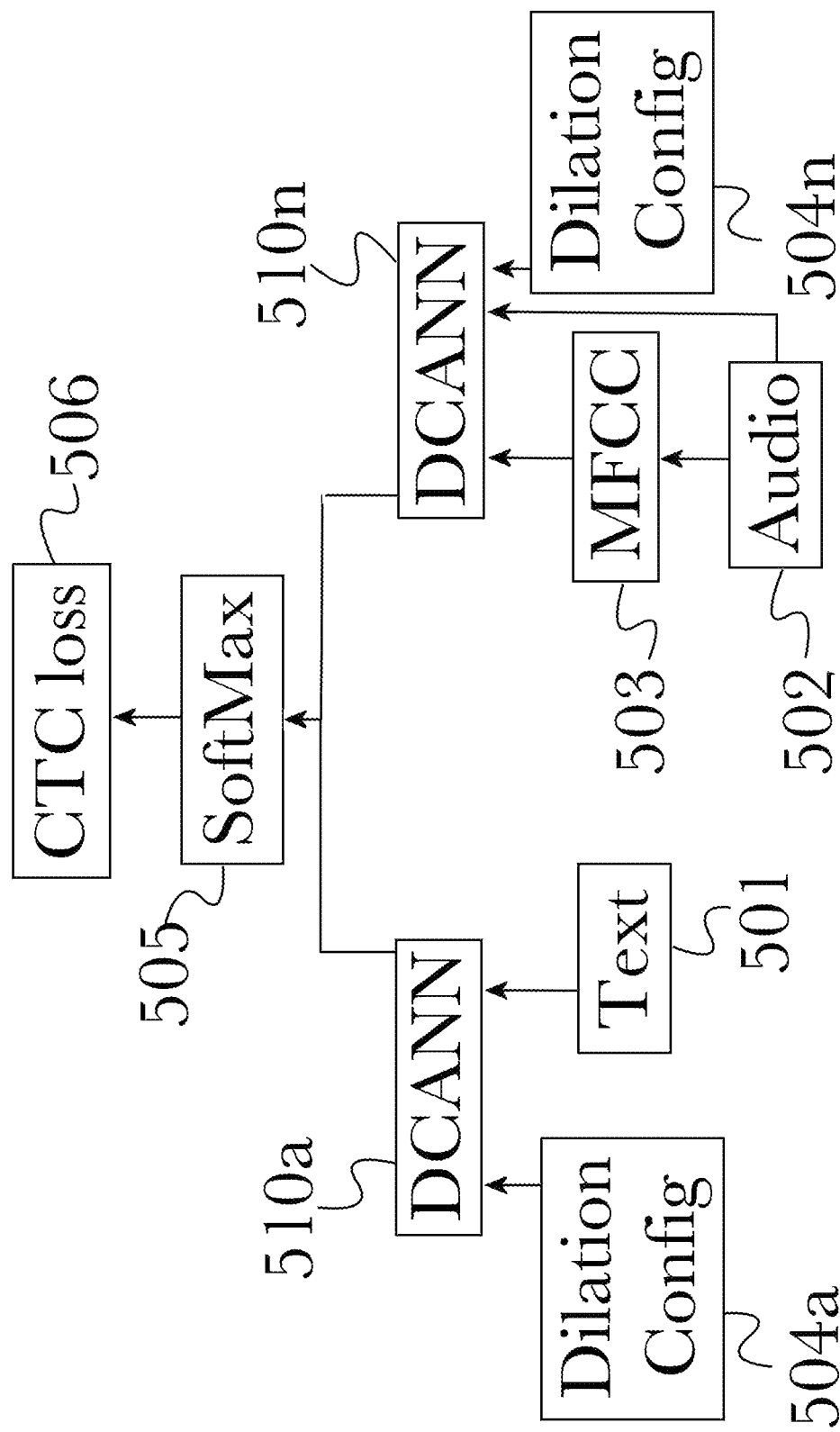
FIG. 5 is an illustration of an automated emotion recognition engine, illustrating the use of dilated convolutional artificial neural networks, according to one aspect.

FIG. 5 is an illustration of an automated emotion recognition engine, illustrating the use of dilated convolutional artificial neural networks, according to one aspect. According to the aspect, a DCANN 510*a* may be used to receive text-based content 501 for use as training or conditioning input, or for production use in emotion recognition operations. Another DCANN 510*n* may also be used to receive audio-based content 502 for similar use in training, conditioning, or emotion recognition, so that appropriately-trained DCANN models 510*a*-*n* may be used to handle content more accurately by restricting the type of content each particular DCANN receives and for which it is trained. For example, selections from audiobooks may be used to provide similar input data (being both a text and audio version of the same selection) to be used to provide controlled training material for multiple DCANNs 510*a*-*n*. This may be used to select ideal training materials and consistently train both text and audio-focused DCANNs 510*a*-*n* to achieve a desired performance result, while also allowing for automated training using a large body of material by simply providing a library of audiobooks (of arbitrarily large size, according to a particular arrangement or use case) to be used.

Additionally, audio input 502 may be provided both in raw form or it may be preprocessed, as shown via two separate input paths. For example, an exemplary preprocessing operation may be to extract the short-term power spectrum of the audio selection, which may then be reduced to a plurality of discrete mel-frequency cepstral coefficients (MFCCs) 503 that collectively make up the mel-frequency cepstrum (MFC) for the audio selection. MFCCs 503 can be derived by taking the Fourier transform of a windowed selection of a signal, mapping the powers of the spectrum obtained onto the mel scale using triangular overlapping windows, then take the logarithms of the powers at each of the mel frequencies, as well as the discrete cosine transform of the list of mel logarithm powers, as if it were a signal, producing a spectrum comprising a set of amplitudes, which are the MFCCs. For example, from an audio sample a fast Fourier transform (FFT) may be used to isolate a frequency range, such as the lower bass frequencies of the voice, which may be used to determine a fundamental frequency for a speaker to account for voice changes during conversation (to avoid falsely identifying a single speaker as multiple people, for example).

Each DCANN 510*a-n* may produce a plurality of processed output values based at least in part on a loaded dilation configuration 504*a-n* that defines such factors as timestep length (for example, 10 ms is a commonly-used timestep interval in audio processing) and dilation factor (as described below, referring to FIG. 13) to direct the operation of a DCANN. The output values produced may then be processed using a SoftMax function 505, given as:

$$\sigma(z)_j = \frac{e^{z_j}}{\sum_{k=1}^{K} e^{z_k}} \text{ for } j = 1, \ldots, K.$$

Processing using the SoftMax function produces a probability distribution over K for various possible outcomes, enabling the selection of the "best" solution based on the probability. Selected values are then combined over the given timestep factor to produce a best "path" of individual values using connectionist temporal classification loss (CTC loss) 506 to select the ideal path without the need for excessive manual labeling of each individual value. This approach uses probability to predict the best values ahead of time based on the previously-known values, which when combined with the probabilistic output of the SoftMax function enables sophisticated training and modeling that can automatically select not only the best-match for any individual value, but also for sets or sequences of values. In the context of emotion recognition or injection, this may be used to select the emotion with the highest probability value or the least error for each given timestep or path of timesteps, resulting in accurate emotion selection with arbitrary granularity within a text or audio selection. For example, an emotion may be recognized or applied across a large period of text or audio, while other emotions may apply to smaller, more discrete portions within the larger timeframe, resulting in complex combinations of emotions over time that more realistically reflect the nature of human interaction (a variety of exemplary emotions and combinations are described below, referring to FIG. 7).

Figure 20:
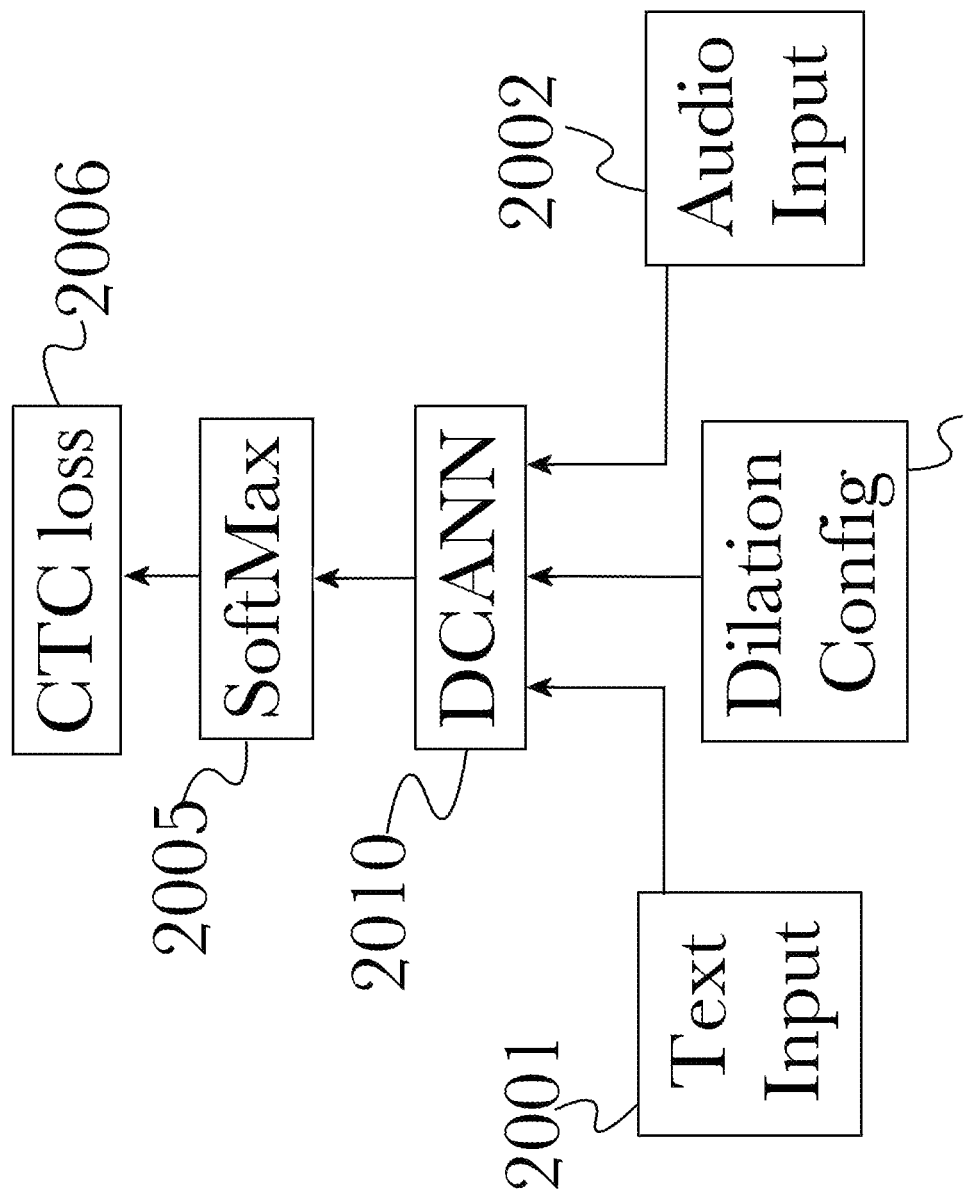
FIG. 20 is an illustration of an automated emotion recognition engine, illustrating the use of a single dilated convolutional artificial neural network to process both text and audio input vectors, according to one aspect.

FIG. 20 is an illustration of an automated emotion recognition engine, illustrating the use of a single dilated convolutional artificial neural network (DCANN) 2010 to process both text 2001 and audio 2002 input vectors, according to one aspect. According to the aspect, a single DCANN 2010 may be used to handle both text 2001 and audio 2002 input, accepting a variety of rich input vectors that need not be limited to a particular medium, or multiple DCANNs may be used to handle a single input type (such as using multiple DCANNs in parallel to process text input, as described below in FIG. 9). In this manner, it can be appreciated that various quantities and combinations of DCANNs and input types may be used according to a desired arrangement or to achieve a desired result. audio input 2002 may be provided both in raw form as shown or it may be preprocessed as described and illustrated previously in FIG. 5, though the alternate input path is not shown in FIG. 20 for the sake of clarity. DCANN 2010 may produce a plurality of processed output values based at least in part on a loaded dilation configuration 2003 that defines such factors as timestep length (for example, 10 ms is a commonly-used timestep interval in audio processing) and dilation factor (as described below, referring to FIG. 13) to direct the operation of a DCANN. The output values produced may then be processed using a SoftMax function 2005, producing a probability distribution over K for various possible outcomes, enabling the selection of the "best" solution based on the probability. Selected values are then combined over the given timestep factor to produce a best "path" of individual values using connectionist temporal classification loss (CTC loss) 2006 to select the ideal path without the need for excessive manual labeling of each individual value. This process is described in more detail above, again with reference to FIG. 5.

Figure 6:
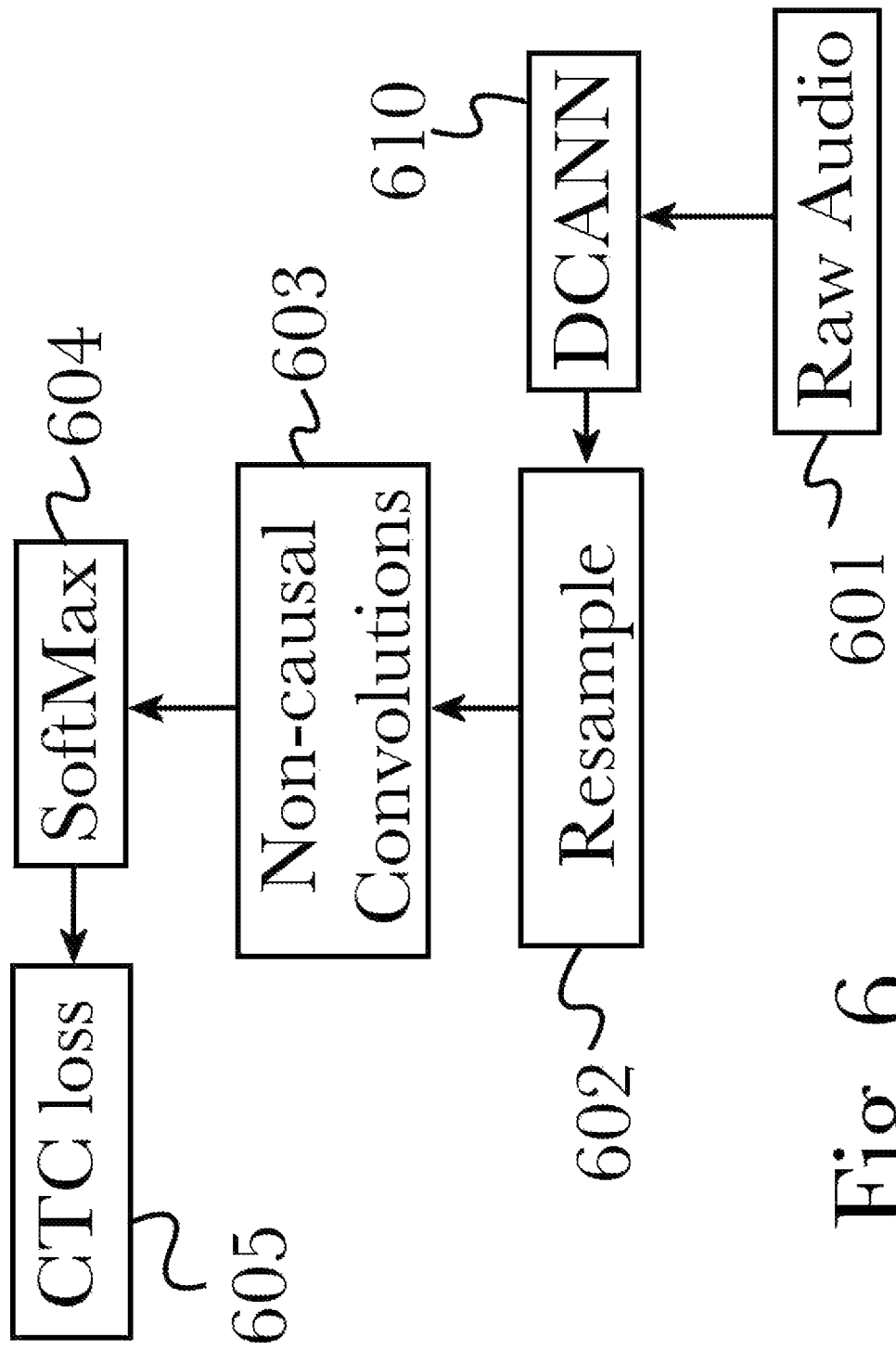
FIG. 6 is an illustration of an automated emotion injection engine, illustrating the use of a dilated convolutional artificial neural network, according to one aspect.

FIG. 6 is an illustration of the training of an automated emotion injection engine, illustrating the use of a dilated convolutional artificial neural network, according to one aspect. According to the aspect, raw audio (for example, audio generated for use in an interaction) may be used as input 601 for a DCANN 610, and output may then be followed by a resampling 602 to upsample the emotion labels to match the desired time intervals of audio. Then, non-causal convolutions may be applied 603, that are convolutions that can now look forward in time as well as back, using predictive modeling based on the probabilities produced by DCANN processing. The outputs of these non-causal convolutions may then be processed using the SoftMax function 604 (as described previously, referring to FIG. 5), and finally loss-minimized 605 such as to arrive at the "best fit" emotion labels to be used with the selection of raw audio, or to produce the next audio output segment.

According to various arrangements and usage scenarios, a DCANN 510*a-n*, 610 may be used to receive call information such as audio and metadata tags or other content indicators, to train the operational model of DCANN 610 using call characteristics as input values. A DCANN 510*a-n*, 610 may also be used to produce output comprising emotion-enhanced audio as described below (referring to FIG. 15) for presentation during interactions, such as for playback via IVR 190 as emotion-enhanced voice prompts or responses to caller input. Text-to-speech (TTS) engine 191 may be used to produce audio from text-based prompts, and may be used to provide text-based training data to DCANN 610 such as emotion content identifiers for use in training the operational model to produce emotion-enhanced audio output.

Various methods of training a DCANN 510*a-n*, 610 may be utilized to achieve a desired result, for example training using manually-curated data tagged with emotion to direct the training in a controllable manner, or by providing a large corpus of text-based content for automated training use (such as, for example, training a model using a selection of books, online articles, or social media such as discussion boards). This may be used to train a particular DCANN to recognize and select appropriate emotion content based on the text in question, for example using word recognition, phrase identification, context awareness, and other text-based features that may be used to determine an appropriate emotion for a particular passage of text. Another example may be to use audio as training input, wherein a DCANN reduces the audio sample to a text transcript with emotion markers tagged appropriately (optionally along with a variety of other additional metadata such as indicators for specific speech characteristics like inflection or tempo), processing a selection of audio and producing a selection of text that transcribes the linguistic content of the audio, and describes the emotion contained within the audio as a series of emotional states in time.

When producing emotion-enhanced audio for output, speech audio samples may be altered to convey emotional content in a variety of ways including (but not limited to) altering the pitch or articulation of sounds or syllables, specific word or phrase selection (as some words or phrases may imply certain emotional connotations), speech tempo, or other audio markers of emotion. Additionally, the voice or other characteristics may be modified to simulate multiple speakers, or a particular speaker (for example, to provide a consistent "presence" for a particular customer interaction system by deliberately simulating a single speaker for all produced audio across interactions). This may be enhanced by using speaker-specific audio for training, providing conditioned data to achieve a desired performance result in a particular DCANN, or to condition based on specific speech characteristics at various levels, such as word choice (such as using slang, profanity, technical jargon, regional jargon, etc.), tone (such as certain intonation tendencies or patterns), verbal mannerisms (such as a particular way of pronouncing certain sounds or words, or nonlinguistic mannerisms such as clicking the teeth or tongue), dialects or accents, or to train using emotion-laden characteristics such as respectfulness or condescension (for example).

According to one aspect, a plurality of DCANNs $510a$-$n$ may be used in combination to achieve a desired emotion-enhancement result, according to various arrangements and use cases. For example, a well-trained text-focused DCANN $510a$ may be used to recognize words, phrases, context, and other text-based linguistic content of a transcribed audio sample provided by an automated speech recognition (ASR) engine 192. This may then be used as input by providing to a second DCANN $510n$ that may be well-trained for selecting and applying emotion enhancements based on text information, producing an emotion-enhanced text transcript for audio generation that may then be provided to yet another DCANN 610 operated by an automated emotion injection engine 420 for use in generating the actual emotion-enhanced audio that will be played back as output. In this manner, individual DCANNs may be trained for specific purposes, allowing more precise performance of each individual task in a complex operation to improve the final result.

Another exemplary use for multiple DCANNs may be to configure multiple DCANNs in an adversarial network arrangement, wherein one DCANN may be used to process input values in an attempt (for example, using a generative mode) to produce emotion-enhanced output that is as realistic as possible, while another DCANN takes input values with emotion and including the output from the first DCANN, and attempts (for example, in a discriminative mode) to identify which content is real and which is synthetically-produced by the other DCANN. This operational model uses DCANNs in a competitive arrangement where the output of one is judged by another, to improve the operation of each through the adaptations and improvements they each make during their adversarial operation.

Figure 7:
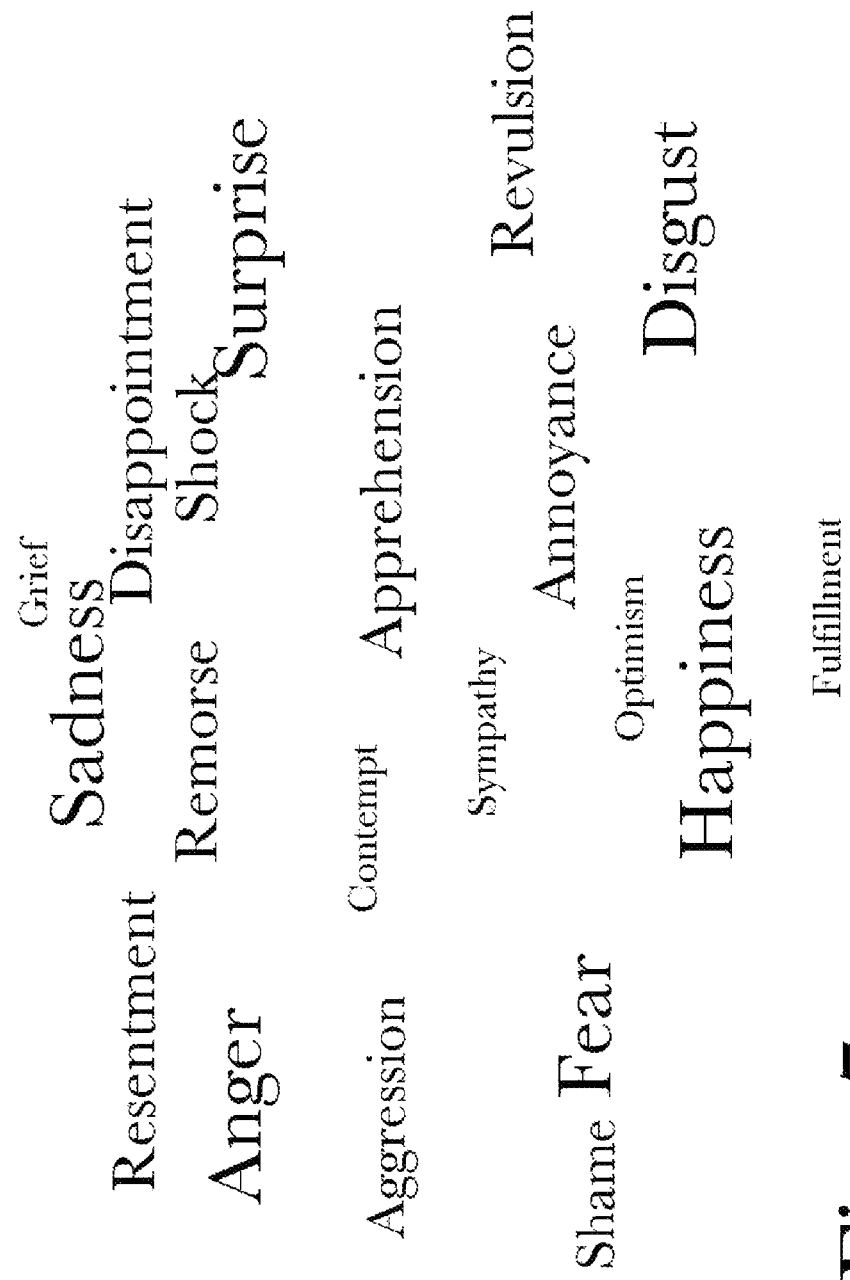
FIG. 7 is a conceptual diagram illustrating the relationships between various emotions and emotion types that may be processed using a dilated convolutional artificial neural network.

FIG. 7 is a conceptual diagram illustrating the relationships between various emotions and emotion types that may be processed using a dilated convolutional artificial neural network. The figure shows a "tag cloud" model representing a number of emotion labels with their sizes and locations approximating their relationships to one another as well as their place within the overall experience of human emotion. Emotion labels are shown near other, related emotions with their distances based on their relative similarity or intensity, and with their size based on their prevalence.

A number of models for human emotion exist, attempting to model and describe the human emotional experience in various ways. Some models utilize the notion of a select few "basic emotions" such as anger, disgust, fear, happiness, sadness, and surprise, and consider more complex and nuanced emotions as varying combinations and intensities of these basic emotions, such that the basic emotions may be thought of as categories of emotion types rather than discrete emotional states. For example, contempt may be modeled as a combination of anger and disgust, each represented to some degree of intensity to form the more complex emotion through their combined expression, or "apprehension" may be a combination of varying degrees of fear and surprise (or fear and excitement, if different basic emotions are selected). It can be seen how, according to such a model, a wide variety of emotions may be expressed through various combinations of basic emotion types in varying intensities, and this "emotion cloud" model may be used in DCANN emotion modeling and also provides an easy-to-understand means to model complex emotional states both for DCANN processing and for a human user to manually curate input data.

Figure 8:
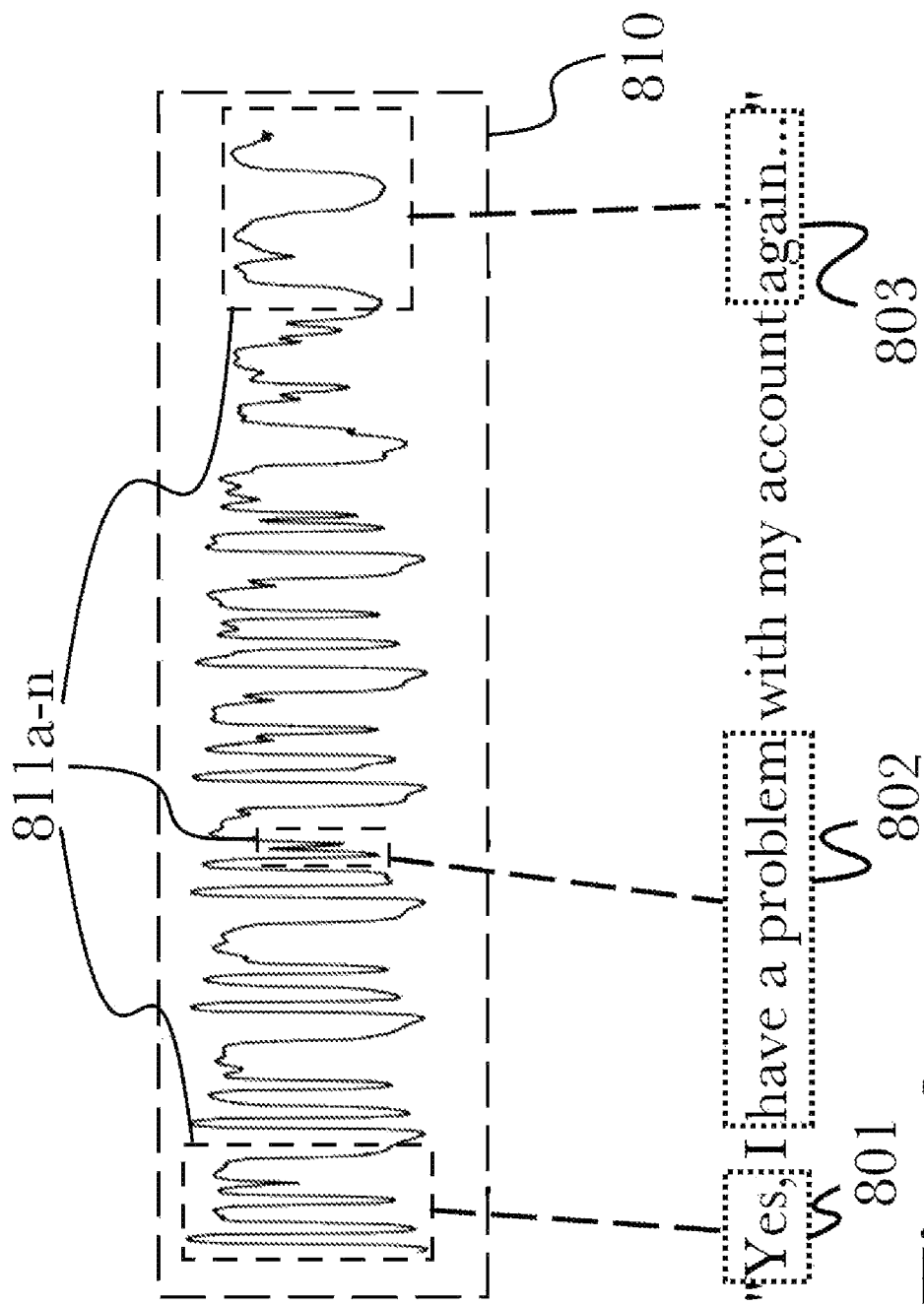
FIG. 8 is an illustration illustrating the relationship between semantic emotion and audio emotion, according to one aspect.

FIG. 8 is an illustration illustrating the relationship between semantic emotion and audio emotion, according to one aspect. According to the aspect, emotion may be similar or distinct between samples of text and audio content. Even when the text and audio are directly related (such as a text transcript of an audio recording), the emotion that may be apparent from one may not necessarily correspond to the other. For example, in the illustrated text sample, simple analysis of the vocabulary may indicate agreeableness 801 or similar positive emotion initially, but then a shift to anger 802 or annoyance, and finally to resignation 803. However, a DCANN processing the corresponding audio sample 810 may identify similar periods of emotion $811a$-$n$, but the actual emotional states may not be the same (or even similar), for example when the caller is speaking the words "problem with my account", their intonation may instead indicate humor or joy, such as one might express when being sarcastic or playful. For example, the caller may not actually have an issue with their account at all, and are actually calling because they have noticed a discount being applied, and are in fact in a good mood despite what a simple text transcript of their word might indicate. By using DCANNs to recognize emotional content in both text and audio, and optionally using the results of these operations combined in sequence as described below (referring to FIG. 9), it becomes possible to accurately recognize these complex emotional qualities that may be hidden through each analysis operation if taken individually. This enables more sophisticated recognition and reproduction of complex emotional states such as sarcasm, playfulness, facetiousness, and others.

Figure 9:
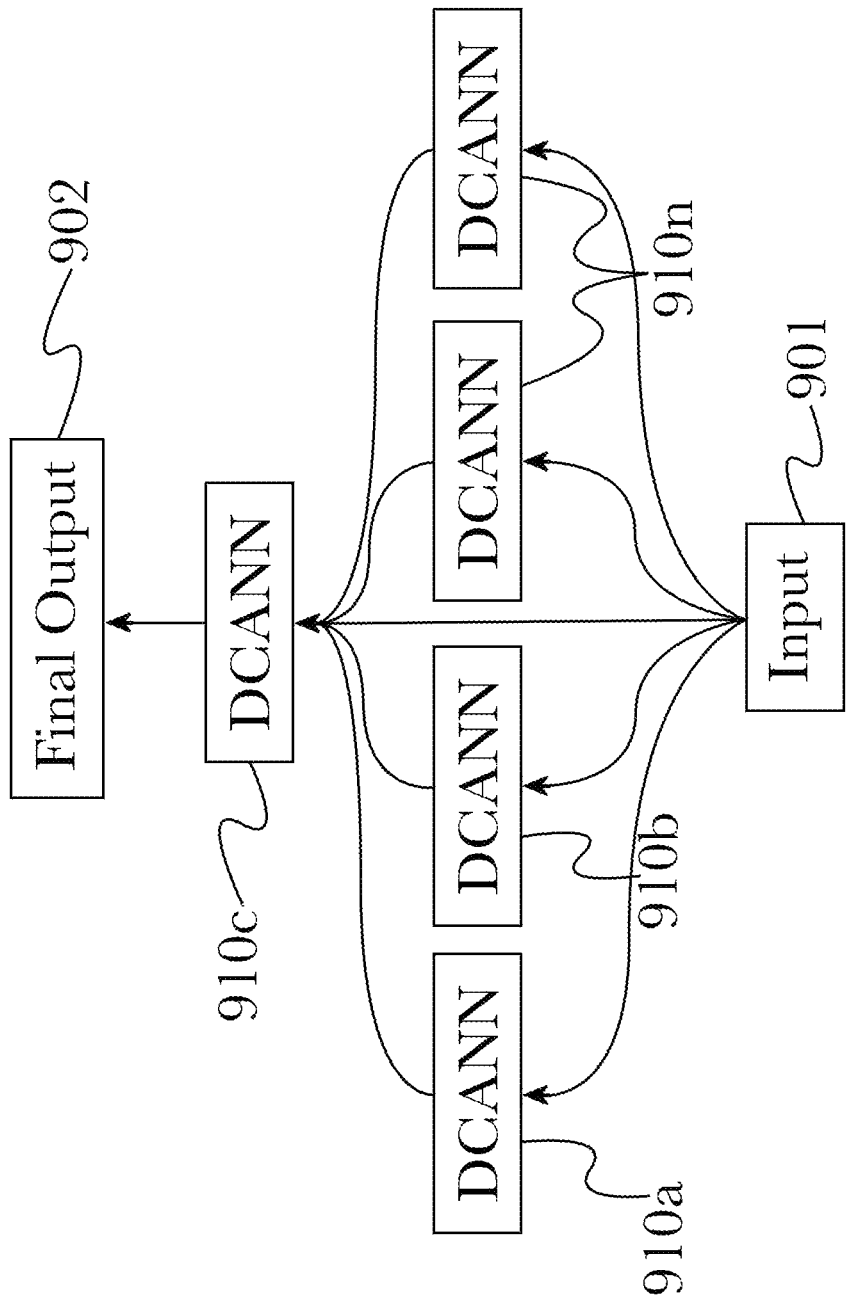
FIG. 9 is an illustration of an automated emotion recognition engine, illustrating the use of a compound neural network arrangement, according to one aspect.

FIG. 9 is an illustration of an automated emotion recognition engine, illustrating the use of a compound neural network arrangement, according to one aspect. According to the aspect, a plurality of DCANNs $910a$-$n$ may be utilized in an arrangement wherein the output values from any of a plurality of DCANNs $910a$,$910b$,$910n$ may be used as input values in another, second-level DCANN $910c$. This arrangement may be used, for example, to combine the strengths of multiple DCANNs that have been trained for specific operations such as recognizing particular emotions with a high degree of accuracy. An initial input 901 may be provided to a plurality of first DCANNs 910a,910b,910n, which may (for example) each recognize and label all occurrences of a single emotional state such as (for example) the emotional state of "anger", which may be considered a broad or base-level emotion category (as described previously, referring to FIG. 7). The output from each first-level DCANN 910a,910b,910n may then be provided to a second-level DCANN 910c that may combine the recognition outputs of all first-level DCANNs 910a,910b,910n and use these outputs as input values to form a final output 902 that combines the strengths of a number of specially-trained DCANNs that each excel at a particular recognition task. In this manner, emotion recognition and injection can be enhanced by using highly-accurate output from any particular DCANN as input for another, to improve the operation of a final DCANN 910c so that a set of output values 902 is reached that comprises the best-fit values using the combined probabilities of each DCANN in the arrangement. Another use case may be to use one DCANN 910a that is well-trained for recognition of emotion based on text input, to process a body of text 901 and then provide the results to a second DCANN 910c to enhance the recognition of emotions in an audio sample, for example by having a labelled transcript of the audio to compare output values against when making a probability determination (as described previously, referring to FIGS. 5-6, and below in FIG. 13).

Figure 10:
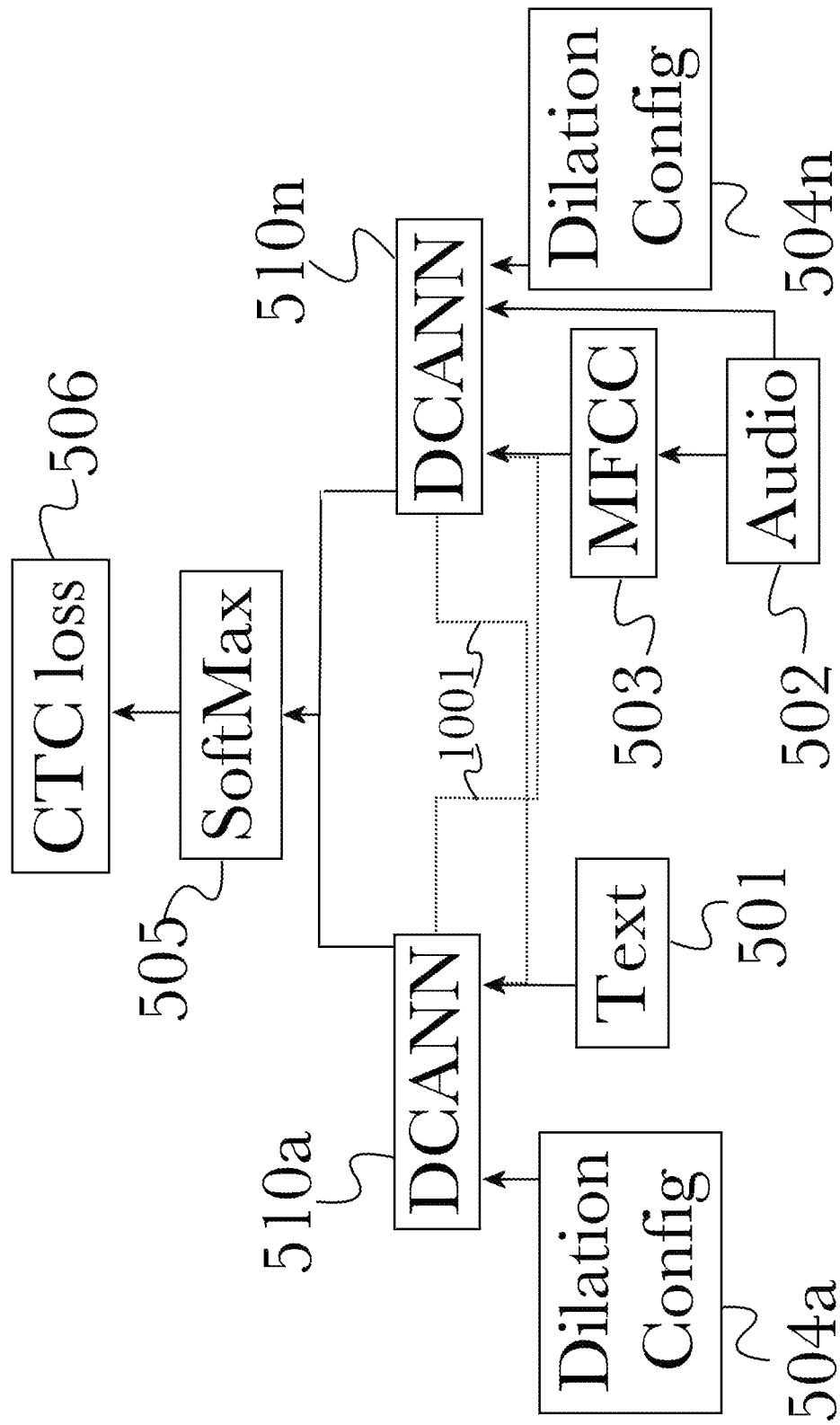
FIG. 10 is an illustration of an automated emotion recognition engine, illustrating the use of semantic output as a conditioning variable for audio processing, according to one aspect.

FIG. 10 is an illustration of an automated emotion recognition engine, illustrating the use of semantic output as a conditioning variable for audio processing, according to one aspect. According to the aspect, the techniques described previously in FIG. 5 and FIG. 9 may be combined to use multiple DCANNs 510a-n in communication with one another to enhance emotion recognition and injection in audio samples. Text input 501 may be processed using a well-trained text-oriented DCANN 510a, and output values from the DCANN 510a (that may be considered trustworthy due to the highly-trained nature of the model) may be provided 1001 to a secondary DCANN 510n that is trained for audio recognition, by using the output from DCANN 510a as additional input vectors 502. These may be combined with actual audio input samples 502 for emotion recognition or injection, for example spoken audio related to the text 501 used by the first DCANN 510a. For example, audio input 502 may comprise five input vectors, each with a value. The text output may be provided 1001 to add three additional vectors (the output values from DCANN 510a) for use, bringing the total number of vectors used as input to 8, each with a value. This may be used, for example, so that DCANN 510a may process and tag emotions in a selection of text that may not be a transcript for the audio being processed by DCANN 510n, but may be similar in terms of emotional or linguistic content. This process may also be performed in a similar, reverse manner in which audio input 502 may be processed using an audio-oriented DCANN 510n and then the resulting output values provided 1001 for use as input vectors by a text-based DCANN 510a to enhance the output values obtained when processing a body of text input 501. In this manner, text-based emotion recognition can be used to further enhance the emulation of emotion in generative audio, even when a direct transcript is not available, and audio-based emotion recognition can be used to enhance text recognition such as when pure-text recognition may be ambiguous without the additional context provided by corresponding audio. Additionally, using multiple DCANNs in this way can enable more nuanced recognition and emulation of emotion such as to incorporate qualities like sarcasm, where there may be an apparent emotion mismatch that can be properly recognized through the use of differently-trained DCANN models (for example, text might indicate anger, but tone of voice in audio might indicate playfulness, or text might indicate a positive emotion while audio indicates annoyance, or other such situations). This may also be used to provide recognition of intent, which may be difficult to recognize through analysis of either text or audio taken individually. By combining recognition of emotional content in both text and audio, it becomes possible to recognize subtle emotional characteristics that would be missed, such as emotion mismatches where the words may indicate one emotional state but the way in which they are spoken indicates a different emotion. Analysis of text alone may provide an inaccurate emotional output, but when audio recognition is combined the spoken emotion provides the necessary context to connect the words with the emotions to reveal the speaker's intent and recognize what is actually "being said", rather than simply recognizing words and a flat representation of simple emotion associated with them.

Figure 11:
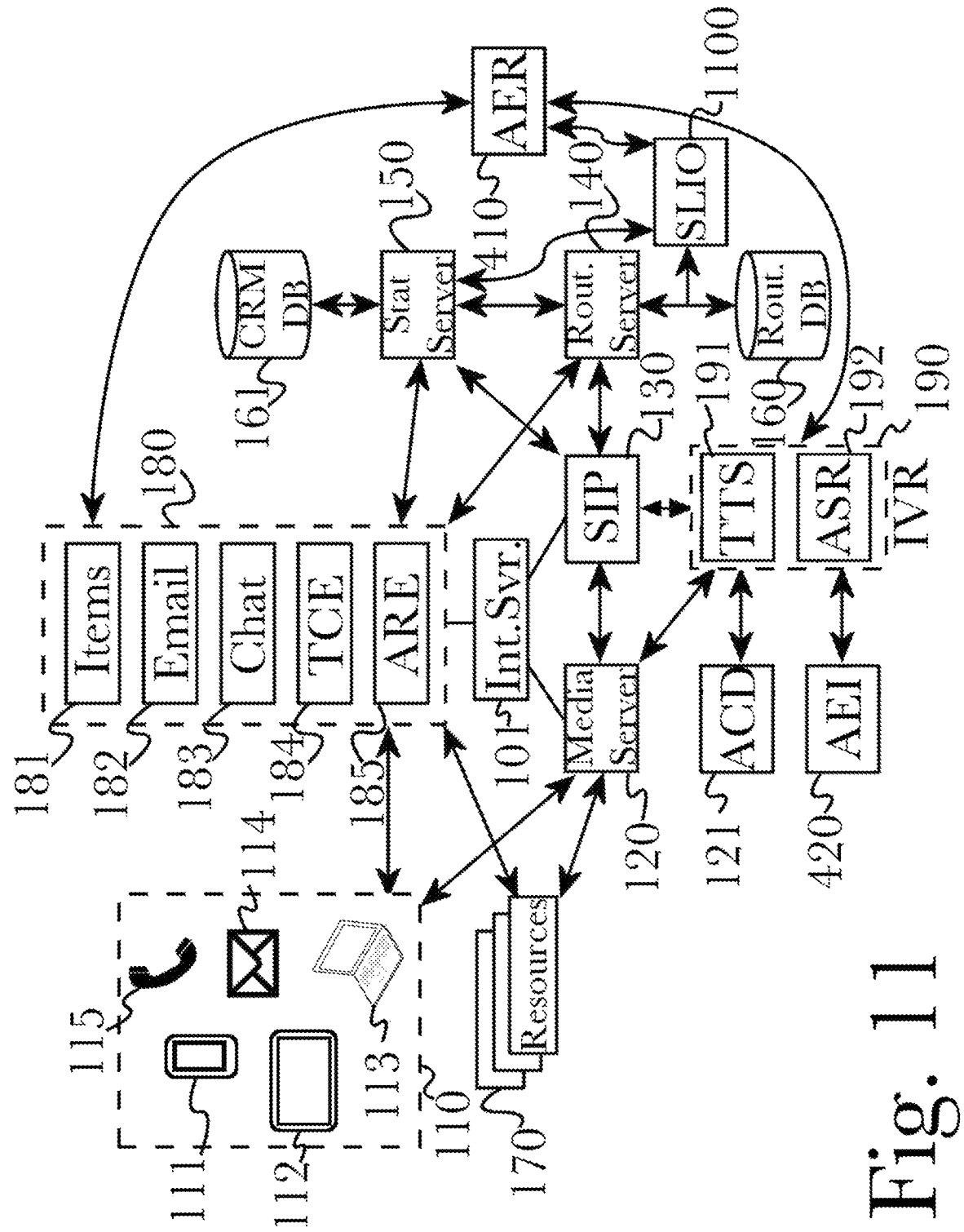
FIG. 11 is a block diagram illustrating an exemplary system architecture for a contact center utilizing a reinforcement learning module comprising a reinforcement learning server and an optimization server, according to one aspect.

FIG. 11 block diagram illustrating an exemplary system architecture for a contact center utilizing a self-learning interaction optimizer (SLIO) 1100 comprising a reinforcement learning server 1110 and an optimization server 1120 (both shown below in FIG. 12), according to one aspect. The optimization server 1120, may communicate with an AER engine 410, as well as the reinforcement learning server 1110, in order to manage and maintain models for operations and control of routing functions and other similar processes associated with connecting resources 170 to customers 110 in an optimized and efficient manner, such as increasing efficiencies by decreasing wait times or assigning tasks to available resources. The reinforcement learning server 1110 may also communicate with a plurality of contact center components in order to access historical and real-time data for incorporation into the design and retraining of models which are then applied by the optimization server 1120 to assign tasks to a plurality of contact center components to achieve a desired goal or outcome. The reinforcement learning server 1110 and the optimization server 1120 work together and in circular and iterative approaches to arrive at decisions, implement decisions as actions, and learn from results of actions which may be incorporated into future models. Collectively, SLIO 1100 along with reinforcement learning server 1110 and the optimization server 1120 comprises a plurality of contact center components adapted to handle interactions of one or more specific channel, be it text channels 180, or multimedia channels 120, resources 170, or customers 110.

Figure 12:
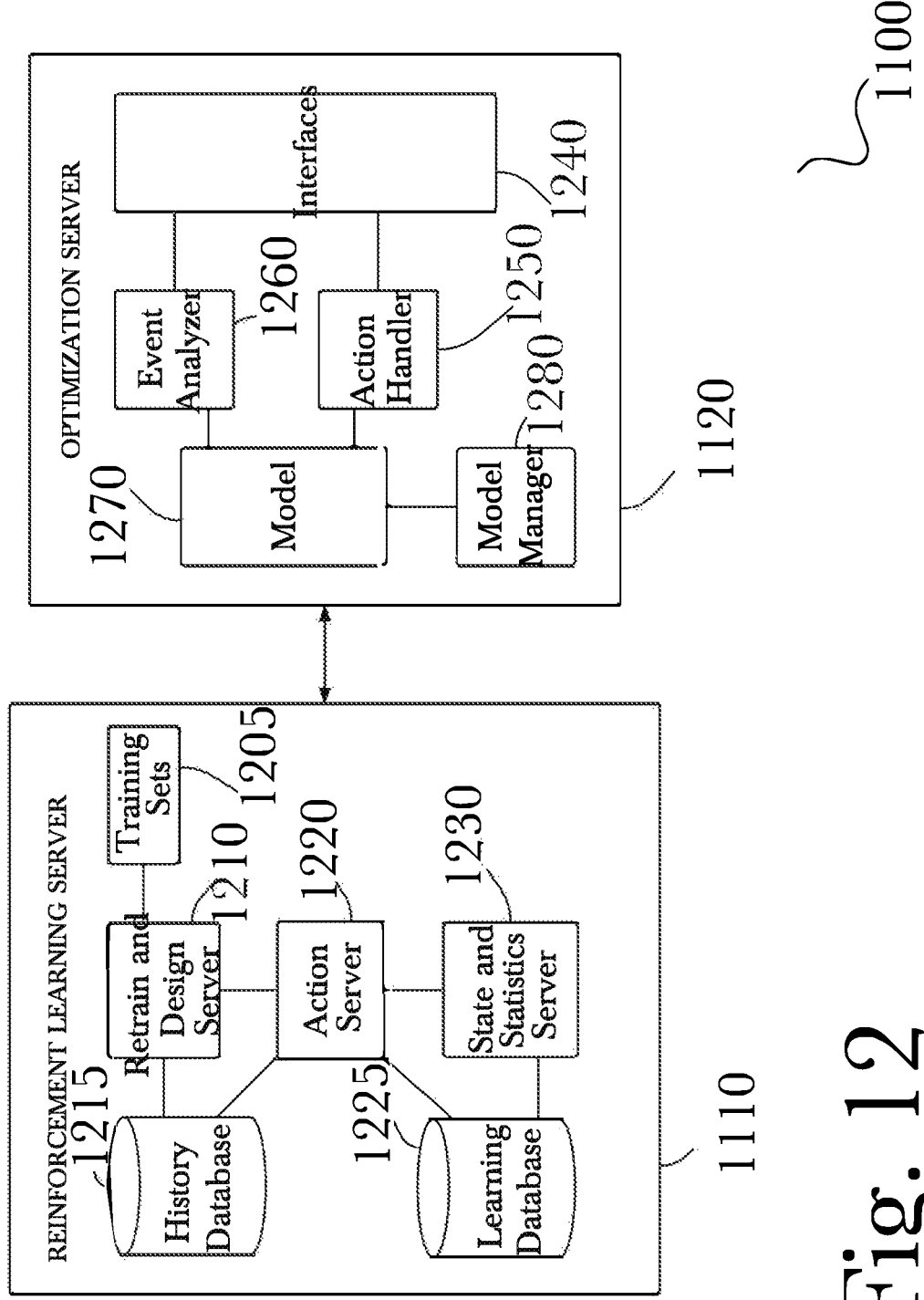
FIG. 12 is a block diagram illustrating an expanded view of an exemplary system architecture for a reinforcement learning module, according to one aspect.

FIG. 12 is a block diagram illustrating an expanded view of an exemplary system architecture for a SLIO 1100, that uses a reinforcement learning server 1110, comprising a retrain and design server 1210, a history database 1215, training sets 1205, a routing and action server 1220, a learning database 1225, and a state and statistics server 1230; and an optimization server 1120, comprising a Markov model 1270, a model manager 1280, an event handler 1260, an action handler 1250, and interfaces 1240, according to a one aspect. The state and statistics server 1230, is responsible for representing and tracking current, real-time states, with a subsystem dedicated to pure Markov model representations of state that are efficiently stored in memory as sparse arrays and is capable of performing large scale and high speed matrix operations, optionally using specialized processors such as computation coprocessors such as Intel XEON PHI™ or graphics processing units (GPUs) such as NVidia TESLA™ instead of CPUs 41. Markov states include all information to be used, available within reinforcement learning system 1100. Any aggregate counts or historical information is stored as a specific state for this purpose, in the learning database 1225, and in the history database 1215, respectively. In this way, a Markov assumption is not restrictive, and any process computed with the reinforcement learning server 1110, and the optimization server 1120, may be represented as a Markov process, within SLIO 1100 with the reinforcing learning module 1200.

Reinforcement learning follows a productive process, training a model 1270, and when the model 1270 is ready, run it through subsets of training sets 1205 to simulate real-time events. States are learned by reviewing history from the history database 1215. Some examples of states include dialing, ringing, on a call, standby, ready, on a break, etc. Once the model 1270 has been tested, it is set into motion in live action, and it controls a routing and action server 1220 which then works to record more history to store in the history database 1215, creates training sets 1205, and reapply the model 1270 based on more data, learning from more data. Once live, an optimization server 1120 is engaged to control actions. Components of SLIO 1100 work in "black-box" scenarios, as stand-alone units that only interface with established components, with no realization that other components exist in the system. Within the optimization server 1120 an action handler 1250 may act as a pacing manager, in communication with contact center systems via interfaces 1240. The action handler 1250 may also concern itself with dialing and giving orders to hardware to dial, receive status reports, and translate dialing results, such as connection, transfer, hang-up, etc. The action handler 1250 dictates actions to the SLIO 1100. The model 1270 is comprised of a set of algorithms, but the action handler 1250 uses the model 1270 to decide and determine optimal movements and actions, which are then put into action, and the optimization server 1120 learns from actions taken in real-time and incorporates observations and results to determine a further optimal actions. The event analyzer 1260 receives events from the state and statistics server 1230, or the statistics server 150, or any other contact center components, and then receives events as states, interprets events (states) in terms of the model 1270, then decides what optimal actions to take and communicates with the action handler 1250 which then decides how to implement a chosen action, and sends it via interface 1240 out to any of the server components, such as statistics server 150, routing server 140, and so forth. The event analyzer 1260 receives events, interprets events in accordance with the model 1270, and based on results, actions are determined to be executed. An action is a directive to do something. Actions are handled by the action handler 1250. An event, or state, is a recording that something has been done. Actions lead to states, and states trigger actions. The model manager 1280 maintains the model 1270 while inputs are being received. Once put into action, the reinforcement learning module 1200 is learning as time advances. Any event, or state, being introduced passes through the reinforcement learning server 1110 and any event, or state, being acted upon by the optimization server 1120 passes back through the reinforcement learning server 1110. Following this logic, the reinforcement learning module 1200 sees what is happening in a current state as well as records respective results of actions taken.

The optimization server 1120 carries out instructions from the model 1270 by analyzing events with the event analyzer 1260, and sending out optimal actions to be executed by the action handler 1250 based on those events. The reinforcement learning server 1110, during runtime, may be receiving a plurality of events, and action directives, and interpreting them, and adjusting new actions as time advances. The model manager 1280 receives increments from the model 1270, and from the reinforcement learning server 1110, and dynamically updates the model 1270 that is being used. Model manager 1280 maintains a version of what is the current model 1270, as well as have the option to change the model 1270 each time an incremental dataset is received, which may even mean changing the model every few minutes, or even seconds, OR after a prescribed quantity of changes are received.

Using a SLIO 1100 with the emotion recognition and injection capabilities provided through the use of DCANNs, it becomes possible to automatically recognize emotion in interactions, and then select an optimum action or path based on the recognized emotions and curation of the emotion injected into responses presented during the interaction.

Figure 13:
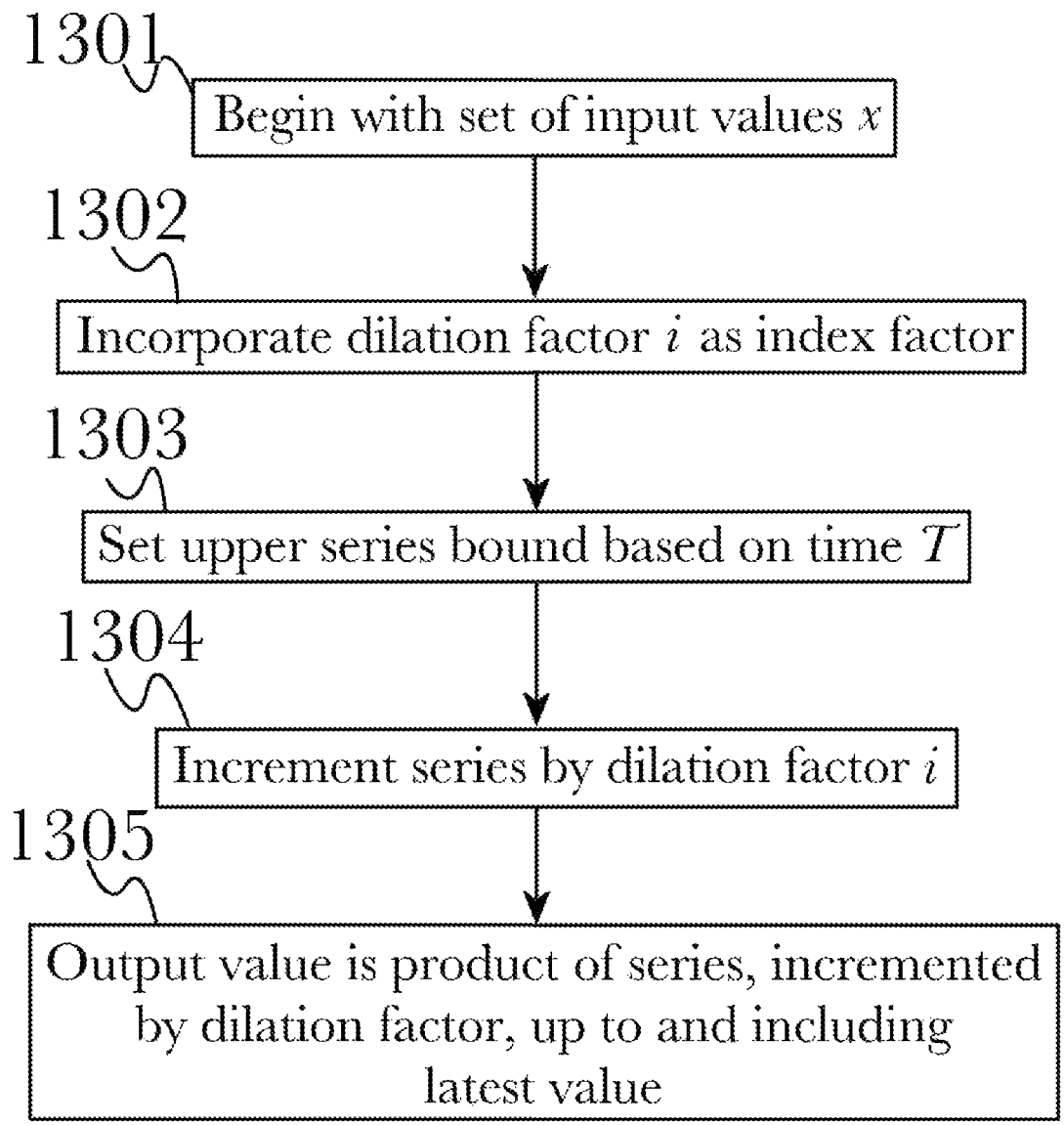
FIG. 13 is a flow diagram illustrating an exemplary algorithm that models output of a dilated convolutional neural network as a product of a series of input values.

FIG. 13 is a flow diagram illustrating an exemplary algorithm 1300 that models output of a dilated convolutional neural network as a product of a series of input values. Given a set of input values x 1301, and a dilation factor t 1302, the operation of a DCANN may be modeled as a product of a series of inputs bounded by time T 1303, incremented by the dilation factor t 1304 as the index factor, producing a final output p(x) 1305 that incorporates each input value as factors in the series, up to and including the latest value $x_t$. This results in an output waveform x whose joint probability may be factorized as a product of conditional probability according to the formula:

$$p(x) = \prod_{t=1}^{T} p(x_t \mid x_1, \ldots, x_{t-1})$$

Stacked dilated convolutions enable networks to have very large receptive fields with just a few layers, while preserving the input resolution throughout the network as well as computational efficiency.

Given an additional input h, a DCANN can model the conditional distribution p(x|h) of the audio given this input, changing the probability formula to:

$$p(x \mid h) = \prod_{t=1}^{T} p(x_t \mid x_1, \ldots, x_{t-1}, h)$$

By conditioning the learning model on other input variables, a DCANN's audio generation can be guided to produce audio waveforms with specific characteristics. This can be used, for example, to produce multi-speaker audio by providing speaker identity as an input variable, or in TTS synthesis information about the text transcript can be provided as input.

Figure 14:
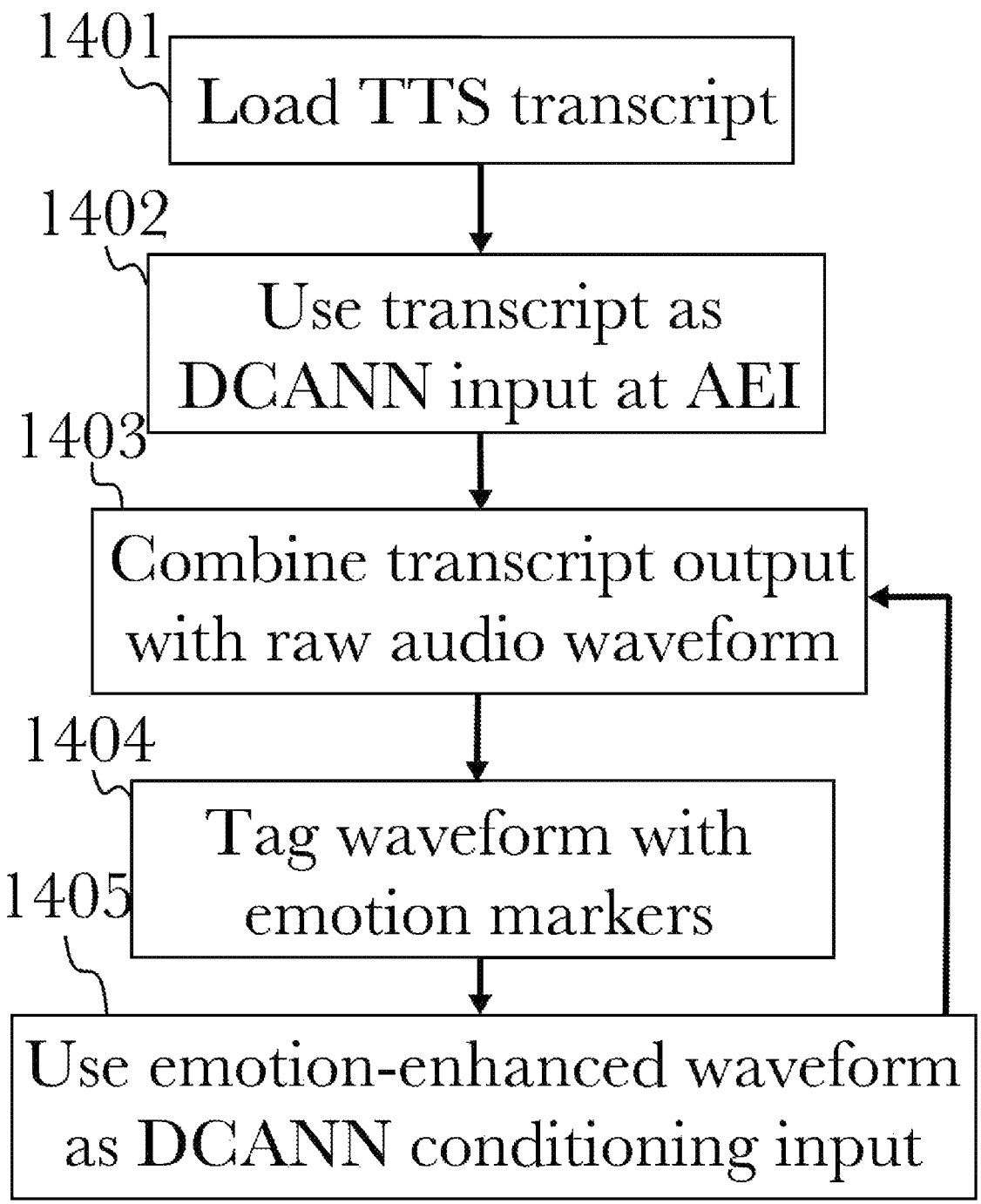
FIG. 14 is a flow diagram illustrating an exemplary method for emotion-enhanced natural speech audio generation using dilated convolutional neural networks, according to one aspect.

FIG. 14 is a flow diagram illustrating an exemplary method 1400 for emotion-enhanced natural speech audio generation using dilated convolutional neural networks, according to one aspect. In an initial step 1401, a TTS script (that is, a selection of text to be turned into speech) is loaded by a TTS engine 191, comprising any of a wide variety of text-based content or scripts to be used in the generation of synthetic speech. This transcript may then be provided 1402 to an automated emotion injection (AEI) engine 420 for use as input for a DCANN 610 in generating raw audio waveforms based on the transcript, to synthesize human speech comprising the content of the transcript in spoken form. Resulting raw audio may then be processed 1403 along with the original transcript, which may comprise a variety of emotional content markers that may not have been incorporated into the audio waveform (generally because an initial raw audio generation process will incorporate only linguistic and phonetic content, discarding additional data that is unrecognized without further training according to the aspects). In a next step 1404, the AEI engine 420 may "tag" or associate portions of the raw audio waveform with emotional content markers from the transcript, using the known information of when the emotional markers occurred to identify their position within the waveform. The resultant emotion-enhanced waveform may then 1405 be passed back to a DCANN 610 as a new input set, conditioning the learning model to train on emotional content in future operations by incorporating the now-known emotional content of the waveform in autoregressive learning progression. This technique incorporates emotional content as input data to continually build upon known samples of audio with embedded emotional data, constantly improving the generation of realistic speech audio by incorporating every iteration of emotion-enhanced audio waveform content to improve the recognition and prediction of emotion within raw audio as it is generated.

Figure 15:
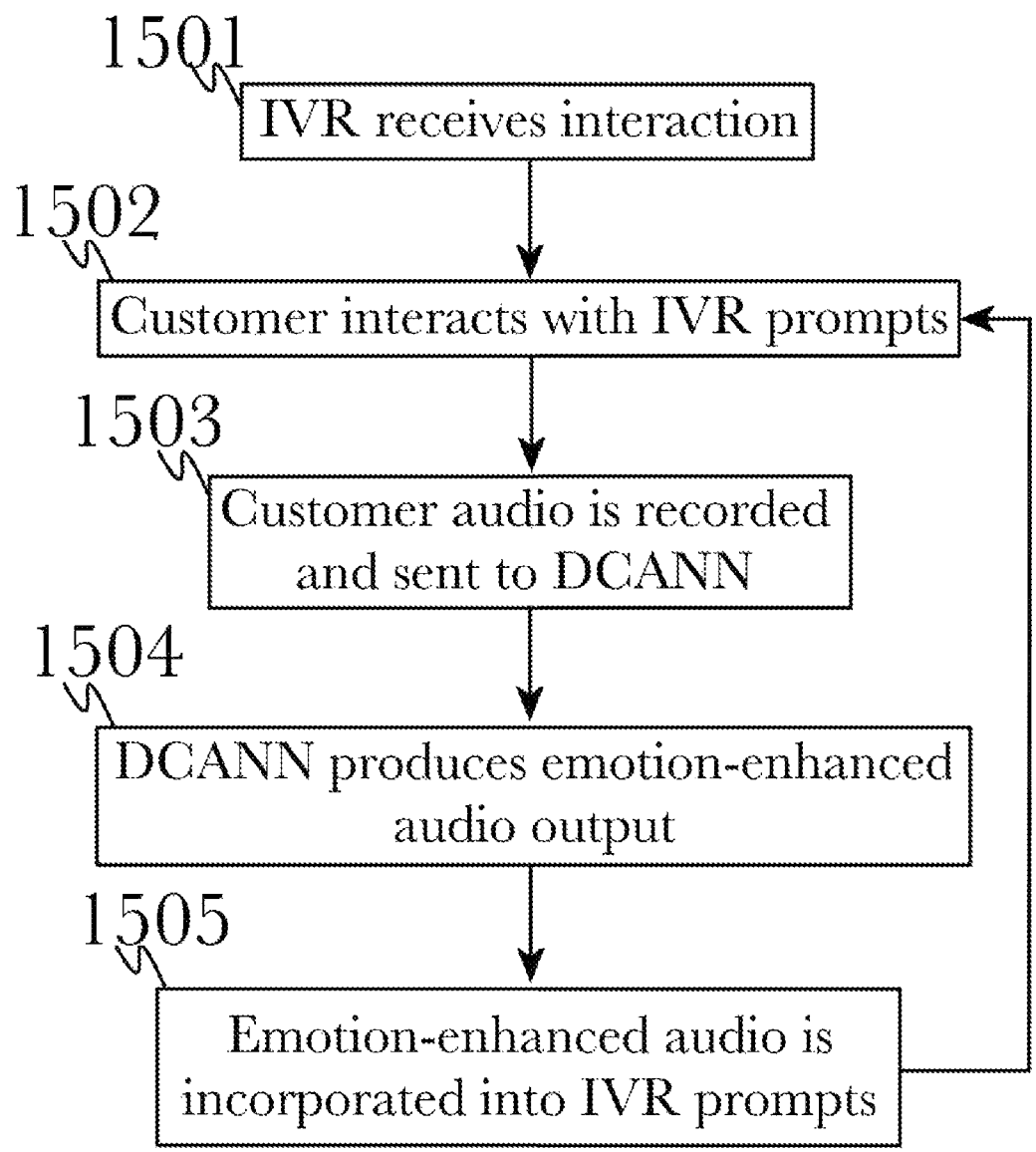
FIG. 15 is a flow diagram illustrating a general process for receiving an inbound call at a contact center, detecting emotional content in the call, and generating emotion-enhanced speech to play back to the caller, according to one aspect.

FIG. 15 is a flow diagram illustrating the general process 1500 for receiving an inbound call at a contact center, detecting emotional content in the call, and generating emotion-enhanced speech to play back to the caller. In an initial step 1501, a contact center receives an inbound call via an interactive voice response (IVR) 190, for example when a customer calls via a customer care phone number. As the customer proceeds through the audio prompts 1502 while interacting with IVR 190, if they provide voice input it may be recorded 1503 and provided to a DCANN for use as an input set. DCANN 610 may then produce emotion-enhanced audio output 1504, which may then be used in future IVR prompts 1505 during the interaction. In this manner, some or all IVR interaction may be enhanced by incorporating portions of emotion-enhanced audio, changing an IVR interaction experience for a customer from an artificial, "one size fits all" experience to a personal one in which the responses have a more natural sound as they adapt to the emotional state of the caller during the interaction, as would occur when interacting with another person.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 16:
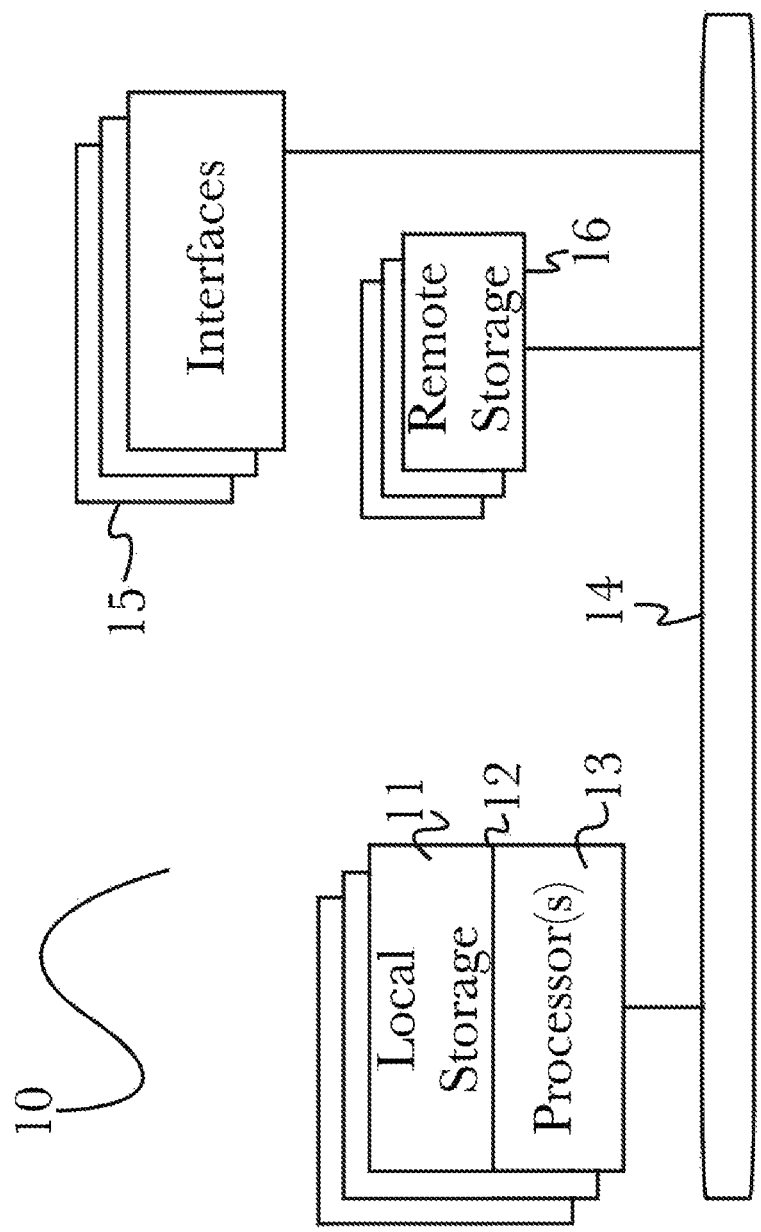
FIG. 16 is a block diagram illustrating an exemplary hardware architecture of a computing device.

Referring now to FIG. 16, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a specific aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 16 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of the present aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 17:
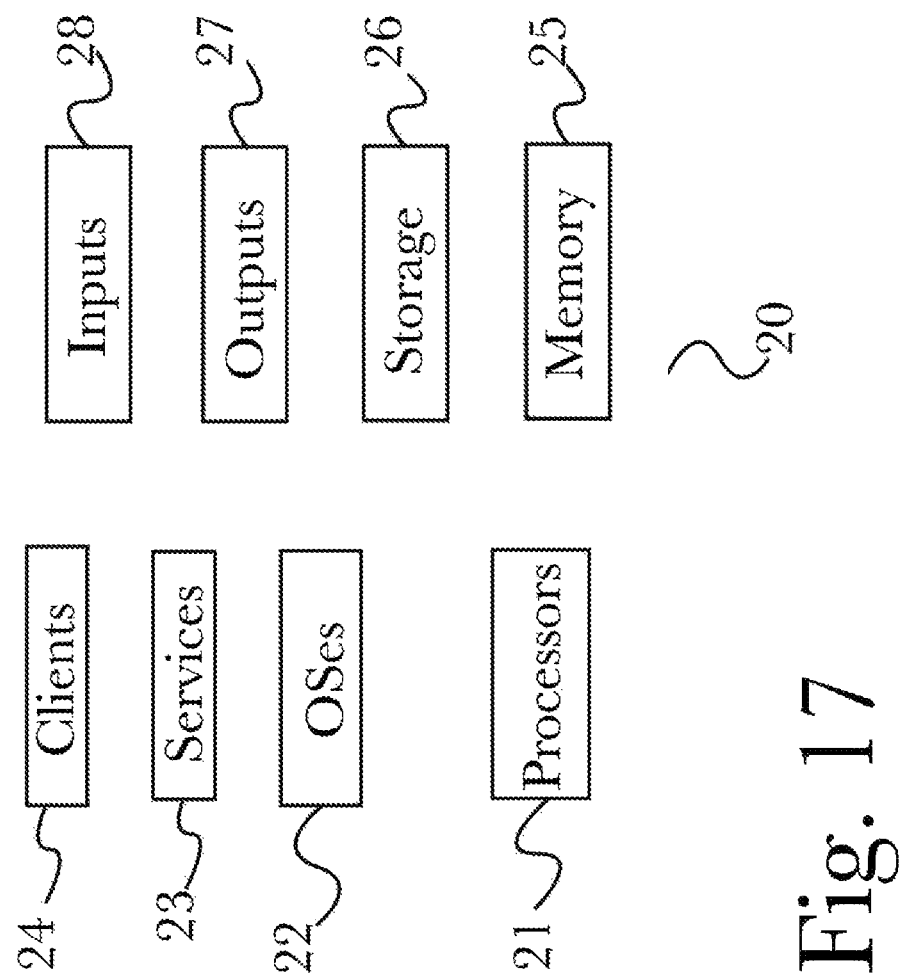
FIG. 17 is a block diagram illustrating an exemplary logical architecture for a client device.

In some aspects, systems according to the present aspect may be implemented on a standalone computing system. Referring now to FIG. 17, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE OSX™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 16). Examples of storage devices 26 include flash memory, magnetic hard drive, CD-ROM, and/or the like.

Figure 18:
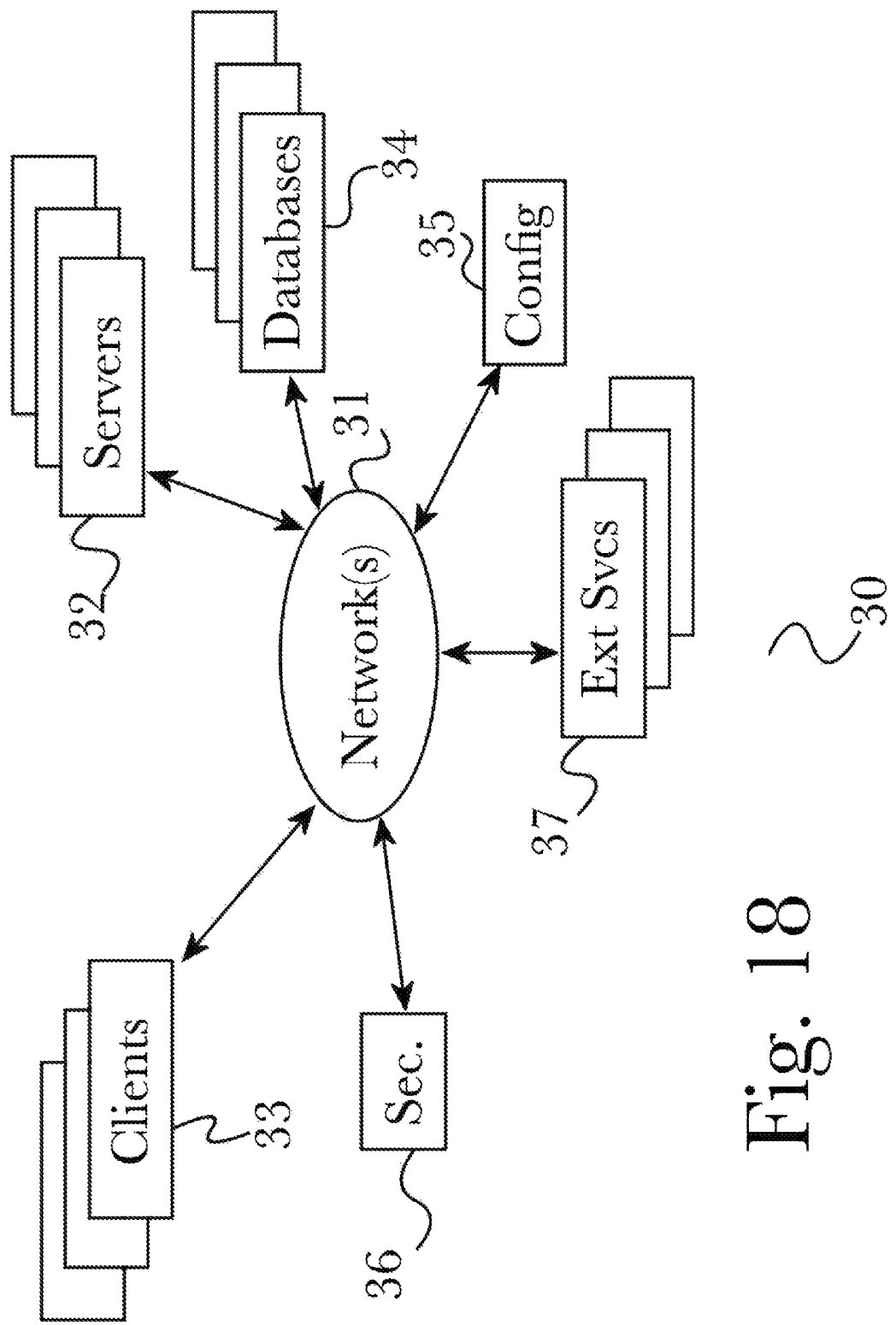
FIG. 18 is a block diagram showing an exemplary architectural arrangement of clients, servers, and external services.

In some aspects, systems of the present aspect may be implemented on a distributed computing network, such as one having any number of clients and/or servers. Referring now to FIG. 18, there is shown a block diagram depicting an exemplary architecture 30 for implementing at least a portion of a system according to an aspect on a distributed computing network. According to the aspect, any number of clients 33 may be provided. Each client 33 may run software for implementing client-side portions of the present aspect; clients may comprise a system 20 such as that illustrated in FIG. 17. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in an aspect where client applications 24 are implemented on a smartphone or other electronic device, client applications 24 may obtain information stored in a server system 32 in the cloud or on an external service 37 deployed on one or more of a particular enterprise's or user's premises.

In some aspects, clients 33 or servers 32 (or both) may make use of one or more specialized services or appliances that may be deployed locally or remotely across one or more networks 31. For example, one or more databases 34 may be used or referred to by one or more aspects. It should be understood by one having ordinary skill in the art that databases 34 may be arranged in a wide variety of architectures and using a wide variety of data access and manipulation means. For example, in various aspects one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 19:
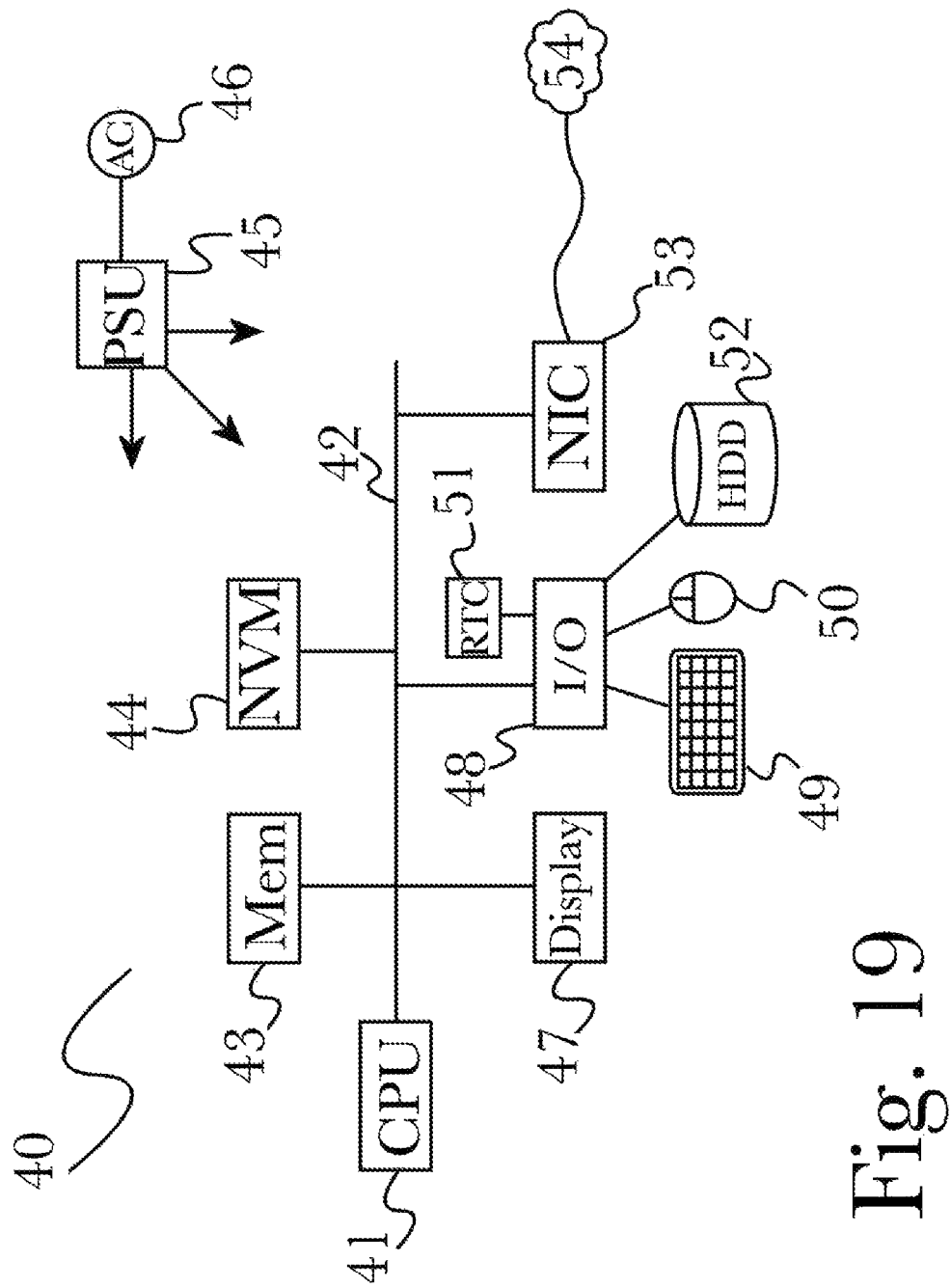
FIG. 19 is another block diagram illustrating an exemplary hardware architecture of a computing device.

FIG. 19 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of the various aspects described herein may be distributed among any number of client and/or server components. For example, various software modules may be implemented for performing various functions in connection with the aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for emotion-enhanced natural speech audio generation using dilated convolutional neural networks, comprising:
   a computing device comprising a memory and a processor;

a first dilated convolutional artificial neural network stored in the memory of, and operating on the processor of, the computing device;

a second dilated convolutional artificial neural network stored in the memory of, and operating on the processor of, the computing device;

a neural network trainer, comprising a first plurality of programming instructions stored in the memory of the computing device which, when operating on the processor of the computing device, causes the computing device to:

train the first dilated convolutional artificial neural network to recognize emotion in text-based content by processing a plurality of text-based training data through the first dilated convolutional artificial neural network;

receive a first set of output data from the first dilated convolutional artificial network, the first set of output data comprising probability-based associations of text with emotions;

train the second dilated convolutional artificial neural network to recognize emotion in audio-based content by providing a plurality of audio-based training-data through the second dilated convolutional artificial neural network, the audio-based training data corresponding to the text-based training data;

receive a second set of output data from the second dilated convolutional artificial network, the second set of output data comprising probability-based associations of modulations of sounds with emotions;

construct an emotion injection model by associating text from the first set of output data with sounds from the second set of output data based on the emotions associated with each; and an automated emotion engine comprising a second plurality of programming instructions stored in the memory of, and operating on the processor of, the computing device, wherein the programming instructions, when operating on the processor, cause the computing device to:

receive text content;

process the text content through the first dilated convolutional artificial neural network to recognize emotional states in the text content; and convert the text content to audio content using a text-to-speech engine, modulating the audio content with the modulations of sounds associated with the text from the emotion injection model.

2. A method for emotion-enhanced natural speech audio generation using dilated convolutional neural networks, comprising:

training a first dilated convolutional artificial neural network to recognize emotion in text-based content by processing a plurality of text-based training data through the first dilated convolutional artificial neural network;

receiving a first set of output data from the first dilated convolutional artificial network, the first set of output data comprising probability-based associations of text with emotions;

training a second dilated convolutional artificial neural network to recognize emotion in audio-based content by providing a plurality of audio-based training-data through the second dilated convolutional artificial neural network, the audio-based training data corresponding to the text-based training data;

receiving a second set of output data from the second dilated convolutional artificial network, the second set of output data comprising probability-based associations of modulations of sounds with emotions;

constructing an emotion injection model by associating text from the first set of output data with sounds from the second set of output data based on the emotions associated with each;

receiving text content;

processing the text content through the first dilated convolutional artificial neural network to recognize emotional states in the text content; and converting the text content to audio content using a text-to-speech engine, and modulating the audio content with the modulations of sounds associated with the text from the emotion injection model.

* * * * *